United States Patent [19]

Barlow et al.

[11] Patent Number: 4,833,601
[45] Date of Patent: May 23, 1989

[54] CACHE RESILIENCY IN PROCESSING A VARIETY OF ADDRESS FAULTS

[75] Inventors: George J. Barlow, Tewksbury, Mass.; James W. Keeley, Nashua, N.H.; Chester M. Nibby, Jr., Beverly, Mass.

[73] Assignee: Bull HN Information Systems Inc., Billerica, Mass.

[21] Appl. No.: 55,577

[22] Filed: May 28, 1987

[51] Int. Cl.[4] .......................... G06F 13/00; G11C 7/00
[52] U.S. Cl. ...................................... 364/200; 371/13;
371/51; 364/243.41; 364/265.3
[58] Field of Search ... 364/200 MS File, 900 MS File, 364/200, 900; 371/13, 21, 51

[56] References Cited

U.S. PATENT DOCUMENTS

| 3,820,078 | 6/1974 | Curley et al. | 340/172.5 |
|---|---|---|---|
| 4,084,236 | 4/1978 | Chelberg et al. | 364/200 |
| 4,322,795 | 3/1982 | Lange et al. | 364/200 |
| 4,464,717 | 8/1984 | Keeley et al. | 364/200 |
| 4,471,429 | 9/1984 | Porter et al. | 364/200 |
| 4,667,288 | 5/1987 | Keeley et al. | 364/200 |
| 4,695,943 | 9/1987 | Keeley et al. | 364/200 |
| 4,768,148 | 8/1988 | Keeley et al. | 364/200 |

Primary Examiner—Gareth D. Shaw
Assistant Examiner—Paul Kulik
Attorney, Agent, or Firm—Faith F. Driscoll; John S. Solakian

[57] ABSTRACT

A cache memory subsystem has multilevel directory memory and buffer memory pipeline stages shared by at least a pair of independently operated central processing units and a first in first out (FIFO) device which connects to a system bus of a tightly coupled data processing system. The cache subsystem includes a number of programmable control circuits which are connected to receive signals representative of the type of operations performable by the cache subsystem. These signals are logically combined for generating an output signal indicating whether or not the contents of the directory memory should be flushed when any one of a number of types of address or system faults has been detected in order to maintain cache coherency.

21 Claims, 11 Drawing Sheets

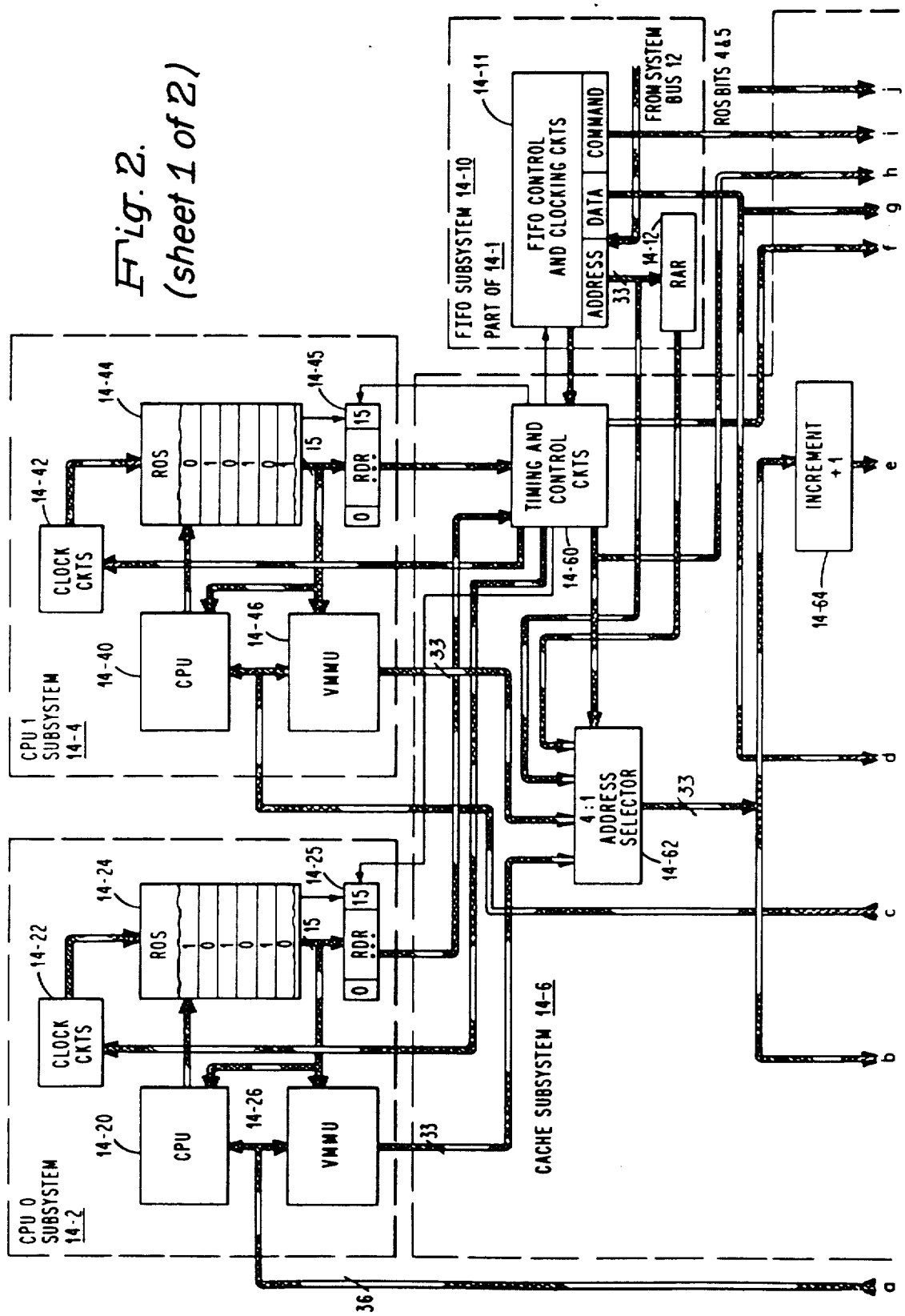
Fig. 2. (sheet 1 of 2)

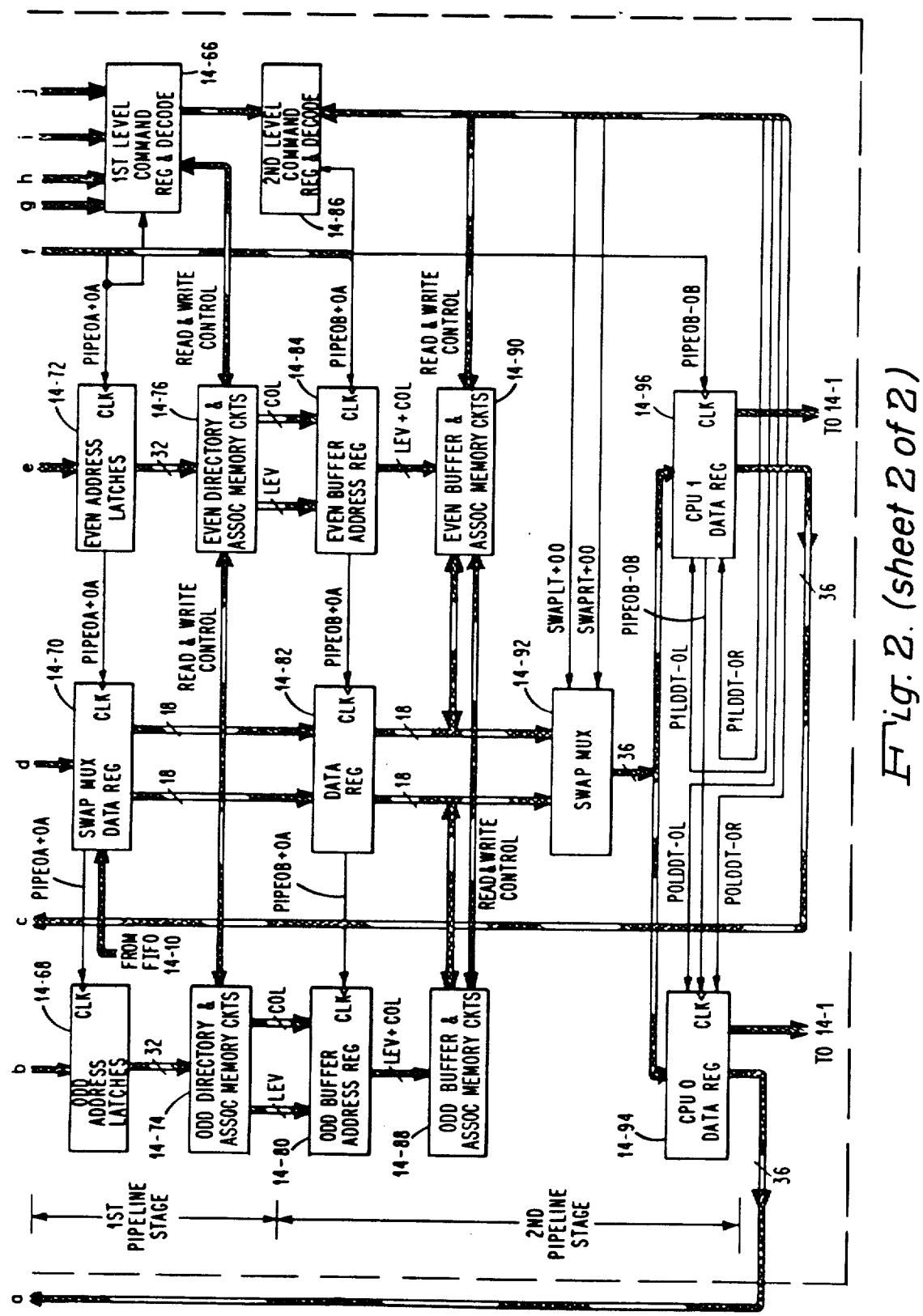
Fig. 2. (sheet 2 of 2)

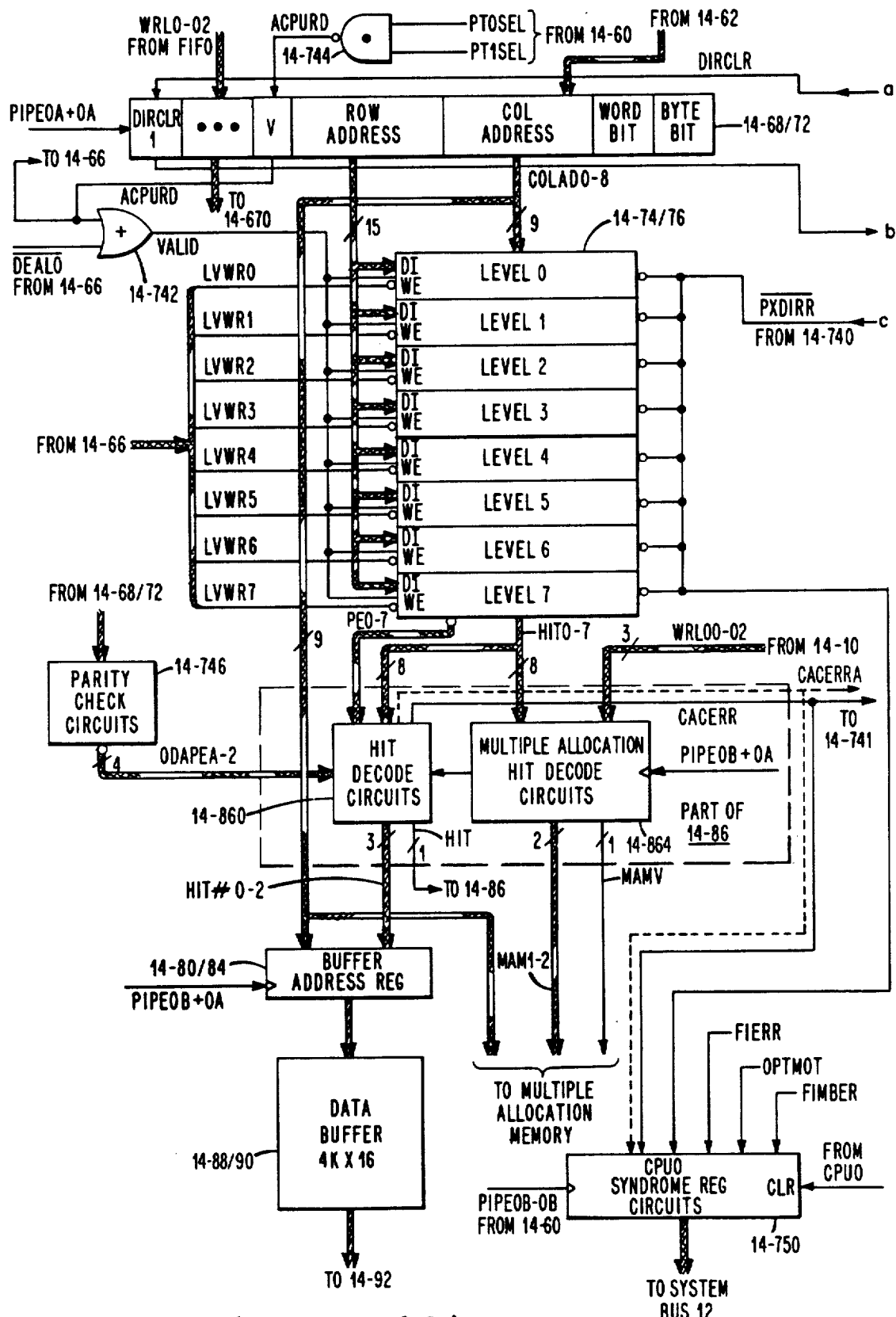
Fig. 3. (sheet 1 of 2)

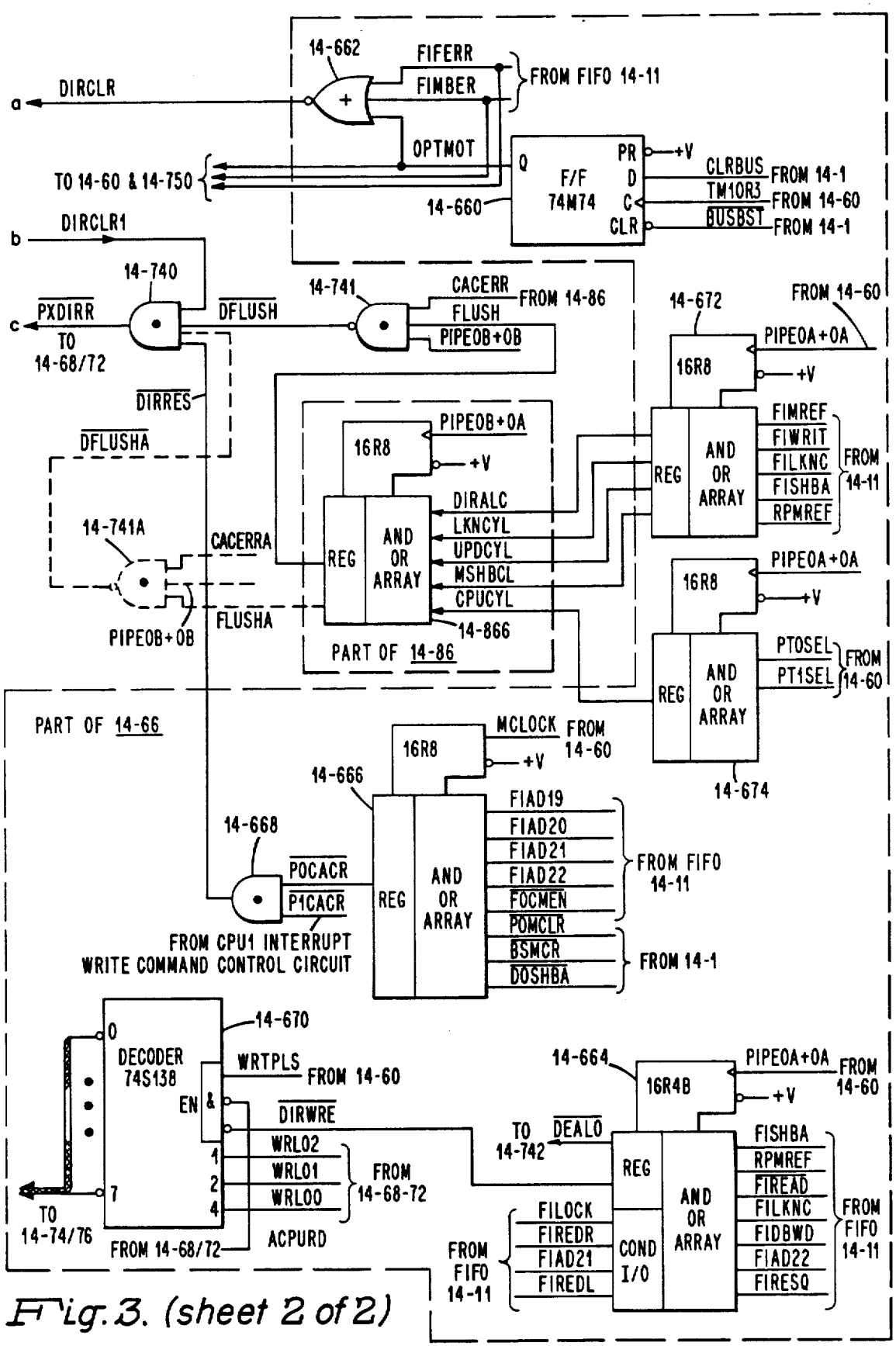
Fig. 3. (sheet 2 of 2)

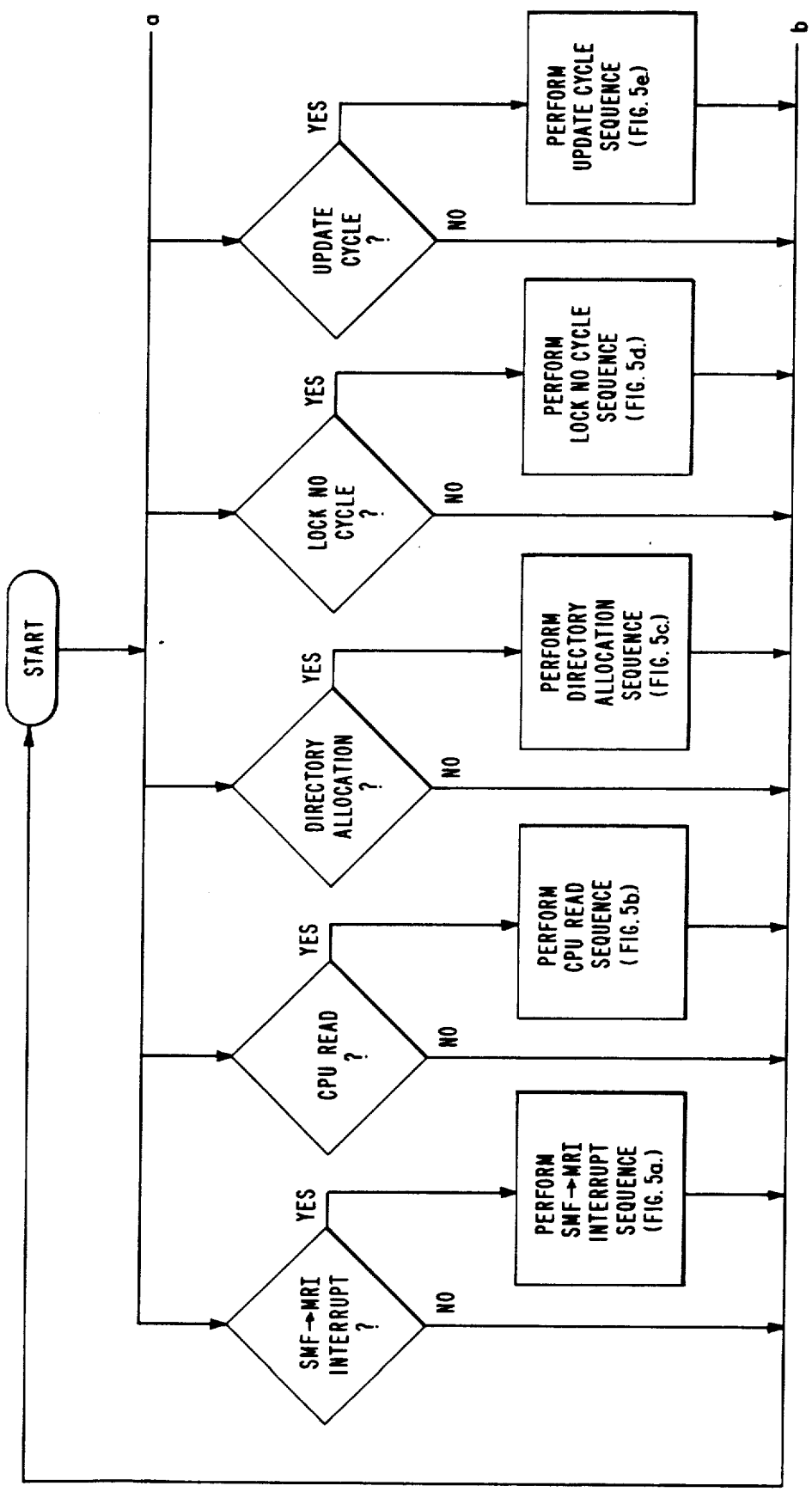
Fig. 4. (sheet 1 of 2)

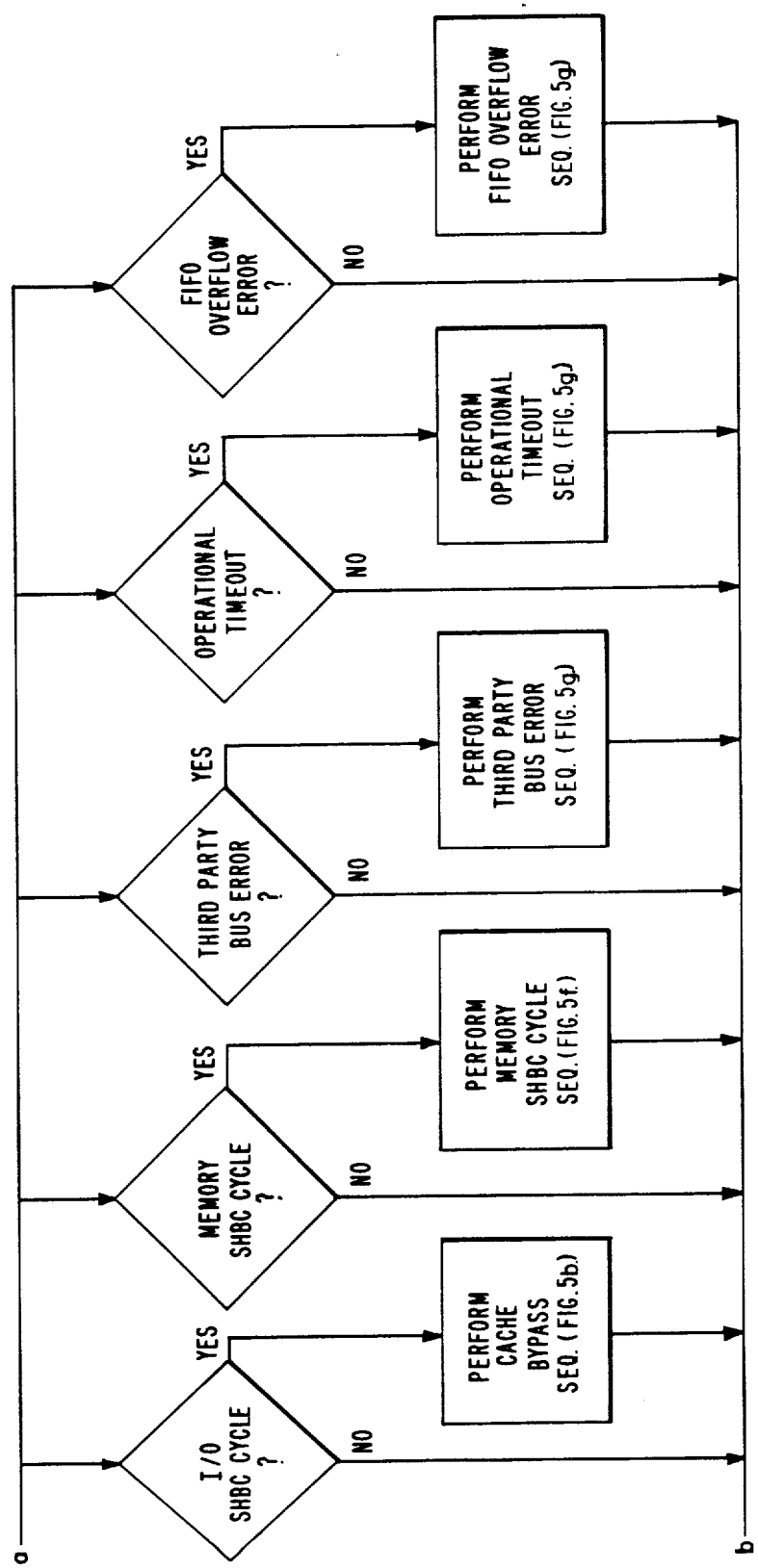
Fig. 4. (sheet 2 of 2)

CACHE RESILIENCY IN PROCESSING A VARIETY OF ADDRESS FAULTS

RELATED PATENT APPLICATIONS

1. The patent application of James W. Keeley and Thomas F. Joyce entitled, "Multiprocessor Shared Pipeline Cache Memory", which issued as U.S. Pat. No. 4,695,943 on Sept. 22, 1987 which is assigned to the same assignee as this patent application.
2. The patent application of James W. Keeley and George J. Barlow entitled, "Read In Process Memory", which issued as U.S. Pat. No. 4,768,148 on Aug. 30, 1988 and which is assigned to the same assignee as this patent application.
3. The patent application of James W. Keeley entitled, "A Coherent Cache System Shared by a Pair of Processing Units", which issued as U.S. Pat. No. 4,785,395 on Nov. 15, 1988 and which is now U.S. Pat. No. 4,785,395 and assigned to the same assignee as this patent application.
4. The patent application of George J. Barlow, et al. entitled, "System Management Apparatus for a Multiprocessor System", filed on May 30, 1986, bearing Ser. No. 06/869,164, which is assigned to the same assignee as this patent application.

BACKGROUND OF THE INVENTION

1. Field of Use

The present invention relates to cache memory systems and more particularly to cache memory systems shared by a plurality of processing units.

2. Background

The related copending patent application titled, "Multiprocessor Shared Pipeline Cache Memory", discloses a cache memory subsystem which has two pipeline stages shareable by a plurality of sources including a number of independently operated central processing units. The first pipeline stage provides for a directory search and compare operation while the second pipeline stage performs the operations of fetching the requested data from the cache buffer memory and its transfer to the requesting source. Timing and control apparatus couples to the sources and allocates each processing unit, time slots which offset their operations by a pipeline stage. Thus, the processing units operate independently and conflict free.

In sharing a cache memory or main memory between a plurality of processing units, there can occur sequences of events or operations which can give rise to incoherency. To avoid this, one solution is to have the processing units share the available memory space and provide a locking mechanism which would prevent one processing unit from modifying information being accessed by another processing unit. While this solution works well for main memory, it can result in excessive data replacement or thrashing which reduces the cache hit ratio. Additionally, this type of arrangement reduces the ability for each processing unit to operate independently.

To avoid this problem, the related copending patent application titled, "A Coherent Cache System Shared by a Pair of Processing Units" discloses an arrangement which permits for completely independent operation of each processing unit by allocating one-half of the total available cache memory space by separate accounting replacement apparatus included within the buffer memory stage. During each directory allocation cycle performed for a processing unit, the allocated space of the other processing unit is checked for the presence of a multiple allocation. The address of the multiple allocated location associated with the processing unit assigned the lower priority is stored in a multiple allocation memory allowing earliest data replacement thereby maintaining data coherency between independently operated processing units.

While the above arrangement prevents data incoherency between independently operated processing units, incoherency still can arise in tightly coupled processing systems in which processing or data handling units share a common main memory. To maintain coherency in such systems, each processing unit which has an associated cache includes a listener device which monitors memory writes applied by other units to a common system bus. This enables the processing unit to update the contents of its cache to reflect changes in the corresponding main memory data made by other units ensuring cache coherency. Sometimes during the updating process, conditions can occur which make it impossible for a processing unit to update cache accurately. For example, the data received by the listener device could be garbled or the memory write applied to the bus produced a time out. The latter condition may occur if the system includes resiliency features such as those disclosed in the copending patent application of George J. Barlow and James W. Keeley entitled, "Resilient Bus System", bearing Ser. No. 06/623,264, filed on June 21, 1984 and now U.S. Pat. No. 4,763,243 and assigned to the same assignee as named herein.

Normally, in the case of garbled data, an error condition would be detected and the data would be discarded. In those cases where the garbled data was presented to the cache unit, the resulting hit or miss generated would not produce trustworthy indications. For example, a miss if wrong could produce multiple allocations. A hit if wrong could result in the updating of the wrong processing unit's data. At this point, whatever action is taken at this point makes the cache unit's contents incoherent.

The above is also true for memory write issued by each processing unit. That is, if the memory write applied to the system bus by the processing unit produces an error, inhibiting the contents of its own cache unit from being updated by that write would prevent further damage. However, it also gives rise to a potential incoherency. To overcome the above, a possible solution would be to provide additional error detection and correction capabilities throughout the system which would be able to reconstruct the bad or garbled data. However, this would prove expensive and quite time-consuming thereby causing a substantial decrease in cache performance. Moreover, it still may not be possible to ensure coherency under all conditions particularly within a system which includes resiliency features.

Accordingly, it is a primary object of the present invention to provide a technique and apparatus which is able to maintain cache coherency in a highly reliable fashion without sacrificing overall performance.

It is a further object of the present invention to maintain coherency within a tightly coupled resilient data processing system.

SUMMARY OF THE INVENTION

The above objects and advantages of the present invention are achieved in a preferred embodiment of a cache memory subsystem. The cache memory subsystem has multilevel directory memory and buffer memory pipeline stages shared by a least a pair of independently operated central processing units and a first in first out (FIFO) device which connects to a system bus of a tightly coupled data processing system in common with the other units of the system.

The cache memory subsystem of the preferred embodiment further includes a number of programmable control circuits. These circuits are connected to receive a plurality of different types of bus operation signals and command signals the system bus through the listener device which define the types of operations or cycles being performed by the cache subsystem. These signals are logically combined to generate an output signal for indicating whether or not the contents of the directory memory should be flushed when any one of a number of address or system faults has been detected. In certain cases, the output signal is combined with a number of signals which indicate the occurrence of a cache address error specifying that the address provided by the requesting input source is untrustworthy or that there was a directory address error. The separate treatment of the different types of address faults enables flushing to occur only when the address fault will make the cache incoherent. If the same action would normally be taken in response to both types of address faults, a single or composite error signal may be used.

The resulting signal is combined with other signals representative of the occurrence of other events or commands to generate a directory reset signal. This signal is applied to all of the levels of the multilevel directory memory for flushing its contents as required for maintaining long term cache coherency. That is, in the system of the present invention, it is presumed that the cache subsystem will maintain the same data over long periods of time in contrast to being frequently flushed or cleared in response to commands from the processing units associated therewith.

In the preferred embodiment, flushing is carried out by clearing to ZEROS the directory contents of all storage locations rendering the current addresses invalid. Flushing is a gentle process in contrast to refilling the entire cache with new data. This allows the conversion of an intolerable condition into a slow reloading of the cache (i.e., produces a series of misses) while still allowing cache operation to continue. This eliminates the need to bypass or degrade the cache and allow operation to continue with substantial degradation in performance until the necessary software recovery procedures can be invoked to restore cache operation. Additionally, it provides resiliency in executing cache operations.

The present invention recognizes and makes full use of the fact that the directory serves as a redundant part within the tightly coupled system and therefore can be temporarily made less efficient in order to respond to certain conditions in a way that maintains cache coherency or consistency.

In the preferred embodiment, the system events selected to cause the directory to be flushed during any cache cycle of operation include a system bus time-out condition, a third party bus cycle error condition, and a FIFO overflow error. Signals representative of other conditions which may result in a high probability of producing cache coherency can be added as inputs to the control circuits as required. The programmable logic array control circuits are programmed to filter out the cycles and system events during which flushing is required to take place for maintaining coherency. Also, the circuits facilitate such additions.

In certain instances, there are types of error conditions which can be processed with a high degree of resiliency without having to flush the directory. One such condition is the case where the data requested and received from main memory by a processing unit contains an uncorrectable memory error as signalled by main memory. As described in the related patent application titled, "Read In Process Memory", the cache subsystem preallocates a storage location of the directory for the requested data during the initial processing of a memory read request. The preferred embodiment of the present invention permits deallocation of a previously allocated directory location when uncorrectable main memory data is received from the system bus during the second half of the processing cycle. The uncorrectable data is transferred to the requesting processing unit for error analysis but is not stored in the cache. By performing a deallocation cycle, cache coherency is ensured. The same deallocation cycle process can be carried out for other types of memory responses.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 2 is a block diagram of one of the central subsystems of FIG. 1 constructed according to the present invention.

FIG. 3 shows in greater detail the circuits of the pipeline stages of FIG. 2.

FIG. 4 is a flow diagram used to explain the overall operation of the apparatus of the present invention.

DESCRIPTION OF THE SYSTEM OF FIG. 1

Figure 1:
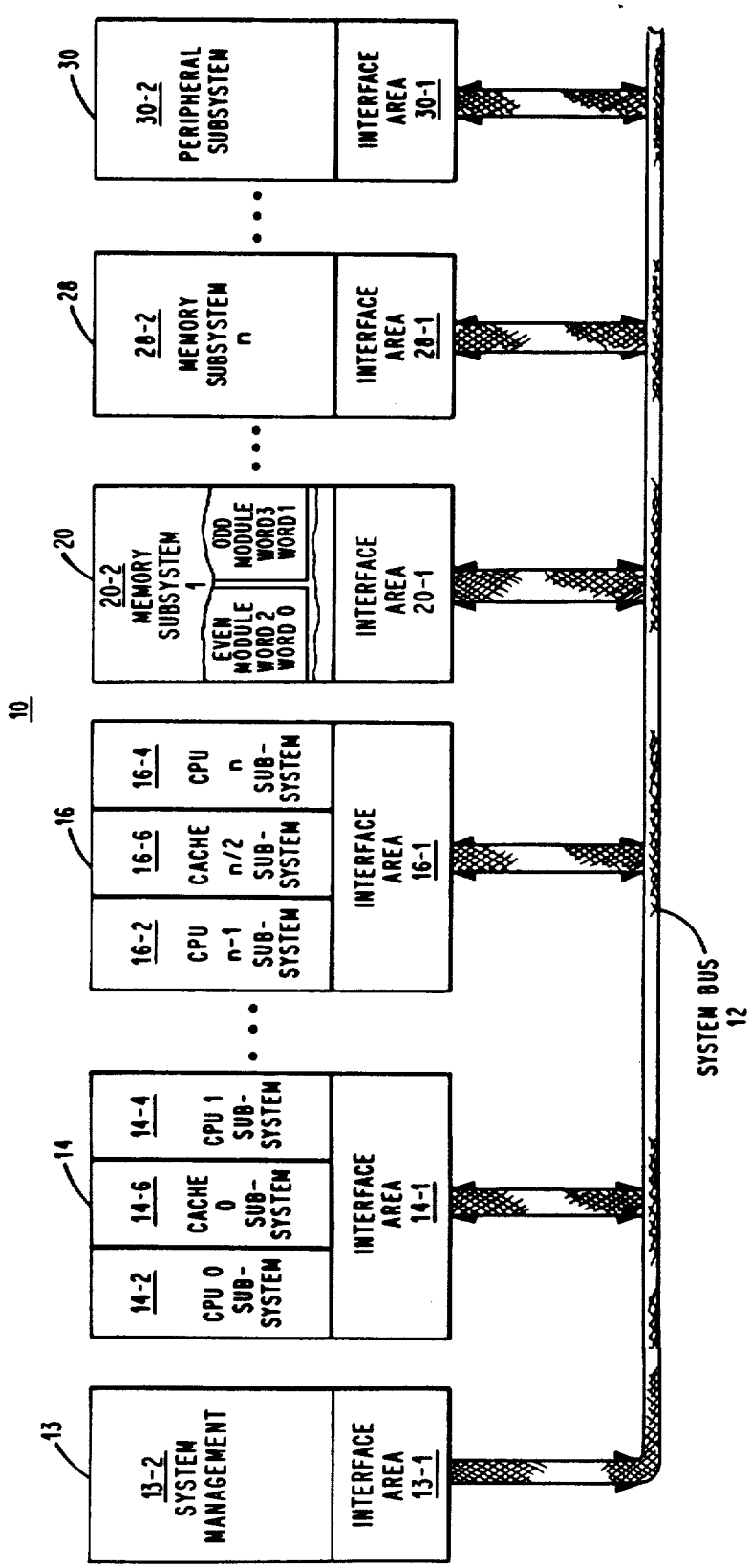
FIG. 1 is a block diagram of a system which includes the apparatus of the present invention.

FIG. 1 shows a multiprocessor data processing system 10 which includes a plurality of subsystems 13 through 30 which couple in common to a system bus 12. The illustrative subsystems include a system management facility (SMF) subsystem 13, a plurality of central subsystems 14 through 16, a plurality of memory subsystems 20 through 28 and a peripheral subsystem 30. Each memory subsystem is organized to include even and odd memory modules as shown in FIG. 1. An example of such an arrangement is disclosed in U.S. Pat. No. 4,432,055.

Each subsystem includes an interface area which enables the unit or units associated therewith to transmit or receive requests in the form of commands, interrupts, data or responses/status to another unit on system bus 12 in an asynchronous manner. That is, each interface area can be assumed to include bus interface logic circuits such as those disclosed in U.S. Pat. No. 3,995,258, entitled "Data Processing System Having a Data Integrity Technique", invented by George J. Barlow.

The SMF subsystem 13 which connects at the far left of bus 12 includes a microprocessing unit and a plurality of centralized resources which are accessible via bus 12 by commands from the central subsystems 14 through 16. Also, the SMF subsystem 13 may issue commands to any one of the central subsystems to assist in the performance of maintenance functions. For further information, reference may be made to the related patent application entitled, "System Management Apparatus for a Multiprocessor System".

The organization of each of the central subsystems 14 through 16 is the same. FIG. 2 shows in block diagram form, the organization of central subsystem 14. Subsystem 14 includes a pair of central processing unit (CPU) subsystems 14-2 and 14-4 coupled to share a cache subsystem 14-6. The cache subsystem 14-6 couples to system bus 12 through a first in first out (FIFO) subsystem 14-10 which can be considered as being included within interface area 14-1.

As seen from FIG. 2, both CPU subsystems 14-2 and 14-4 are identical in construction. That is, each CPU subsystem includes a 32-bit central processing unit (CPU) (i.e., CPU's 14-20 and 14-40), and a virtual memory management unit (VMMU) (i.e., VMMU 14-26 and 14-46) for translating CPU virtual addresses into physical addresses for presentation to cache subsystem 14-6 as part of the memory requests. Also, each CPU subsystem includes a read only store (ROS) and a 16-bit ROS data output register (RDR) (i.e., ROS 14-24, 14-44 and RDR 14-25, 14-45).

At the beginning of each cycle, each ROS is conditioned to read out a 16-bit microinstruction word into its data output (RDR) register which defines the type of operation to be performed during the cycle (firmware step/box). The clock circuits within each CPU subsystem (i.e., circuits 14-22 and 14-42) establish the basic timing for its subsystem under the control of cache subsystem 14-6 as explained herein. The elements of each CPU subsystem can be constructed from standard integrated circuit chips.

As seen from FIG. 2, cache subsystem 14-6 is organized into a source address generation section and two separate pipeline stages, each with its own decode and control circuits. The source address generation section includes blocks 14-62 and 14-64 which perform the functions of source address selecting and incrementing. The first pipeline stage is an address stage and includes the directory circuits of blocks 14-66 through 14-76, arranged as shown. This stage performs the functions of latching the generated source address, directory searching and hit comparing. The first pipeline stage provides as an output information in the form of a level number and a column address. The operations of the first pipeline stage are clocked by timing signals generated by the timing and control circuits of block 14-60.

The information from the first stage is immediately passed onto the second pipeline stage leaving the first stage available for the next source request. The second pipeline stage is a data stage and includes the data buffer and associated memory circuits of blocks 14-80 through 14-96, arranged as shown. This stage performs the functions of accessing the requested data from the buffer memories 14-88 and 14-90, or replacing/storing data with data received from FIFO subsystem 14-10. Thus, the second pipeline stage provides a 36-bit data word for transfer to one of the CPU subsystems. Again, the operations of the second pipeline stage are clocked by timing signals generated by the timing and control circuits of block 14-60.

The different blocks of the first and second pipeline stages are constructed from standard integrated circuits, such as those described in the "The TTL Data Book, Column 3", Copyrighted 1984, by Texas Instruments Inc. and in the "Advanced Micro Devices Programmable Array Logic Handbook", Copyright 1983, by Advanced Micro Devices, Inc. For example, the address selector circuit of block 14-62 is constructed from 74AS1823 tristate register chips wire ORed to select one of four addresses. The swap multiplexer of block 14-92 is constructed from the same type chips. The latches of blocks 14-68 and 14-72 are constructed from 74AS843 D-type latch chips. The swap multiplexer and data register circuits of block 14-70 are constructed from a single clocked programmable array logic element, such as part number AMPA16R6B, manufactured by Advanced Micro Devices, Inc.

The directory memories 14-74 and 14-76 shown in greater detail in FIG. 3 are constructed from 8-bit slice cache address comparator circuits having part number TMS2150JL, manufactured by Texas Instruments Incorporated. The address and data registers 14-80 through 14-84 and 14-94 and 14-96 are constructed from 9-bit interface flip-flops having part number SN74AS823, manufactured by Texas Instruments, Inc.

The buffer and associated memory circuits 14-80 and 14-84 shown in greater detail in FIG. 3 are also constructed from 4K×4-bit memory chips having part number IMS1421, manufactured by INMOS Corporation. The address increment circuits of block 14-64 are constructed from standard ALU chips designated by part number 74AS181A and a programmable array logic element having part number AmPAL16L8B, manufactured by Advanced Micro Devices, Inc.

As described in greater detail herein, the first and second levels of command register and decode circuits of block 14-66 and 14-86, respectively, utilize clocked programmable array logic elements having part numbers AmPAL16R4B and AmPAL16R8B, manufactured by Advanced Micro Devices, Inc. These circuits also are used to generate the required selection, read and write control signals as indicated in FIG. 2 (i.e., signals SWAPLT+00, SWAPRT+00, P0LDDT-OL, P1LDDT-OL, P0LDDT-OR, F1LDDT-OR). For further details, reference may be made to the equations of the Appendix.

As seen from FIG. 2, cache subsystem 14-6 is organized into even and odd sections which permit two data words to be accessed simultaneously in response to either an odd or even memory address. For further information about this type of cache addressing arrangement, reference may be made to U.S. Pat. No. 4,378,591 which is assigned to the same assignee as named herein.

FIG. 2 also shows in block form, FIFO subsystem 14-10 which includes the FIFO control and clocking circuits of block 14-11 which couples to a replacement address register 14-12 and to system bus 12. FIFO subsystem 14-10 receives all of the information transferred between any two subsystems on system bus 12. When the information is for updating data in main memory, the information is coded to indicate such updating or replacement operation. FIFO subsystem 14-10 also receives any new data resulting from a memory request being forwarded to system bus 12 by cache subsystem 14-6. Both update and new data are stored as requests within a buffer memory included within subsystem 14-10. Lastly, the FIFO subsystem 14-10 also stores information transferred by other subsystems during bad bus cycles in performing its role as a listener. That is, FIFO subsystem 14-10 stores such information for updating cache whenever the particular bus cycle during which it is transferred has been acknowledged since it could be sent as a part of a memory write command to one of the memory subsystems. As explained herein, the apparatus of the present invention maintains cache coherency notwithstanding receipt of such information.

FIFO control circuits decode each request and initiate the appropriate cycles of operation which result in address, data and commands being applied to different parts of cache subsystem 14-6 as seen from FIG. 2. For the purpose of the present invention, FIFO subsystem can be considered conventional in design and take the form of the type of FIFO circuits disclosed in U.S. Pat. No. 4,195,340 which is assigned to the same assignee as named herein.

The basic timing for each of the subsystems of FIG. 2 is established by the timing and control circuits of block 14-60. Such control permits the conflict-free sharing of cache subsystem 14-6 by CPU subsystems 14-2 and 14-4 and FIFO subsystem 14-10. The circuits of block 14-60 are described in greater detail in the first related patent application. Briefly, these circuits include address select logic circuits which generate control signals for conditioning address selector 14-62 to select one of the subsystems 14-2, 14-4 and 14-10 as a request address source.

Also, block 14-60 includes pipeline clock circuits which define the different types of cache memory cycles which can initiate the start of the pipeline resulting in the generation of a predetermined sequence of signals in response to each request. That is, first and second signals, respectively, indicate a cache request for service by CPU0 subsystem 14-2 and CPU1 subsystem 14-4 while other signals indicate cache requests for service by FIFO subsystem 14-10.

These requests can be summarized as follows

1. CPU0 READ CYCLE

A CPU0 read occurs in response to a cache request initiated by ROS 14-24 during a first time slot/interval when CPU port 0 within interface 14-1 is not busy. The address supplied by CPU0 subsystem 14-2 is furnished to the first pipeline stage and the directory is read. When a hit is detected, indicating that the requested data is stored in the data buffer, the buffer is read and the data is clocked into the CPU0 data register When a miss is detected, the CPU0 port is made busy, the request is forwarded to memory to fetch the requested data.

2. CPU1 READ CYCLE

A CPU1 read occurs in response to a cache request initiated by ROS 14-44 during a third time slot/interval when CPU port 1 within interface 14-1 is not busy.

3. SECOND HALF BUS CYCLE

A second half bus cycle occurs in response to a first type of cache request initiated by FIFO subsystem 14-10 for data requested from either main memory or an I/O device being returned on system bus 12 during a first or third time slot/interval when FIFO subsystem 14-10 has a request stored. When FIFO subsystem 14-10 furnishes data from an I/O device to the first pipeline state, it passes therethrough without changing the states of any memories and is clocked into the appropriate CPU data register. Data from main memory is written into the cache data buffers and is clocked into the appropriate CPU data registers.

4. MEMORY WRITE UPDATE CYCLE

A memory write update cycle occurs in response to a second type of cache request initiated by FIFO subsystem 14-10 for update data received from system bus 12, upon acknowledgement of such data during a first or third time slot/interval when FIFO subsystem 14-10 has a request stored. FIFO subsystem 14-10 furnishes data to the first pipeline stage resulting in the reading of the directory memory. When a hit is detected, the update data is written into the buffer memory.

5. FIFO ALLOCATION CYCLE

A FIFO allocation occurs in response to a CPU0 or CPU1 READ CYCLE which results in a miss being detected. The CPU port is made busy and the request if forwarded to memory to fetch the requested data. Upon the memory read request being acknowedged, the CPU read request is loaded into the FIFO subsystem registers and control circuits included in the subsystem initiate a request for a FIFO cycle of operation (i.e., force signal CYFIFO=1), signals specifying the type of request and level number information are applied as inputs to the command register and decode circuits of block 14-66. These signals include FIMREF (memory reference), $\overline{\text{FIWRIT}}$ (memory read) and FIDT16-18/19-21 (level number). The signals FIMREF and $\overline{\text{FIWRIT}}$ initiate a FIFO allocation cycle (i.e., FIALOCYC=1).

6. BUS LOCK NO CYCLE

A bus lock no cycle occurs in response to a lock memory read request with a cache hit, which tests the setting of a lock condition for a given memory location. This is used for synchronizing operations in which a CPU subsystem can first read the contents of the memory location, then set the lock and perform a subsequent modify write operation on its contents. In accessing such shared areas of memory, each CPU subsystem verifies that the particular location is not locked by issuing a memory read lock request to memory. The memory generates a response for signalling whether or not the location is locked but does not perform the requested read (i.e., no memory cycle). In the case of a cache miss, a lock no cycle signal is not sent to memory, and this results in a second half bus cycle when the lock condition for the memory location was not previously set.

There are also certain system events which can initiate the start of the pipeline and the generation of the predetermined sequence of signals. These system events which will be explained in greater detail herein include the occurrence of a system bus operational timeout, a bad third party bus cycle and a FIFO overflow condition.

FIG. 3 shows the organization of the even and odd directory and buffer memory pipeline stages according to the present invention. As seen from FIG. 3, the 4K × 16-bit directory memory 14-74/76 is divided into two equal spaces. The first four levels designated 0 through 3 are assigned to CPU0 while the next four levels designated 4 through 7 are assigned to The directory memory 14-74/76, in response to a cache address, generates eight bit output signals (HIT0-7) which are applied to the hit decode circuits of block 14-86. Additionally, the directory memory comparator circuits generate eight parity error signals (PE0-7) which are also applied to the hit decode circuits of block 14-86. The states of these signals indicate if a parity error was detected in any of the directory addresses accessed and compared with the received input address including the valid bit (v) contents of register 14-68/72.

Row address information including the state of the valid bit signal is written into a particular level when a corresponding one of the write enable signals LVWR0 through LVWR7 is forced to a binary ZERO by the circuits of block 14-66. At that time, the contents of the directory memory 14-74/76 can be reset or cleared to ZEROS. This occurs when a signal $\overline{\text{PXDIRR}}$ which connects to all of the reset (R) terminals is forced to a binary ZERO state. For further details, reference may be made to the equations in the Appendix.

The hit decode circuits of block 14-86 include the hit decode circuits of block 14-860 and the multiple allocation hit decode circuits of block 14-864. In the preferred embodiment, separate PLA elements are used to construct the circuits of each of the blocks 14-860 and 14-864 Some of these elements are shown in FIG. 3 and will be explained in greater detail herein. Both of these circuits include priority encoder circuits which operate to select the higher priority level when more than one hit output is present. The priority is based on the level number value with level 0 having the highest priority and level 7 having the lowest priority.

In response to hit output signals HIT0-7, hit decode circuits 14-860 generate a three-bit hit number code corresponding to signals HIT#0-2 in addition to hit output signal HIT used to signal the occurrence of a hit condition. Additionally, hit decode circuits 14-860 receive signals ODAPEA-2 from the parity check circuits of block 14-744. In response to address signals from directory address register 14-68/72, the parity circuits constructed from 74AS280 circuit chips generate parity error signals ODAPEA-2 which indicate whether any bytes of the incoming address received by odd address latches 14-68 from address selector 14-62 have bad parity. It will be appreciated that a similar set of signals will be generated for the even address latches 14-72.

The hit decode circuits 14-860 combine the source parity address signals (e.g. ODAPEA-2) and directory address error signals to generate cache error signal CACERR. This signal serves two functions. First, it is used for bypassing the cache during the subsequent second half of the cache operation. Second, it is used to inhibit or block the hit signal indicators, causing the cache subsystem to fetch the requested data from main memory.

The multiple allocation hit decode circuits 14-864 in response to level number signals WRL00-02 received from FIFO subsystem 14-10 and signals HIT 0-7 operate to generate a two-bit code corresponding to signals MAM1-2 indicating the lower priority level at which a multiple allocation hit occurred in addition to multiple allocation memory signal MAMV. For further details as to how the above mentioned signals are generated, reference may be made to the equations of the Appendix.

The sets of hit output signals are applied to the data buffer and associated memory circuits of block 14-88/90. As shown, these circuits include the buffer address register 14-80/84 and the 4K × 16-bit data buffer 14-88/90.

FIG. 3 shows in greater detail, a number of the different elements which make up the first and second level command and decode circuits of blocks 14-66 and 14-86. According to the present invention, these circuits combine certain system bus 12 signals received via FIFO subsystem 14-10 representative of predetermined conditions for enabling the generation of a directory reset signal $\overline{\text{DIRRES}}$, a flush signal FLUSH and a directory clear signal DIRCLR. The signal FLUSH is combined with timing signal PIPEOB+OB and cache error signal CACERR within a NAND gate 14-741 to produce directory flush signal $\overline{\text{DFLUSH}}$. The three signals are combined within an AND gate 14-740 to produce a directory signal $\overline{\text{PXDIRR}}$ which is applied to the directory reset terminals of the cache directory address comparator circuits 14-74/76 clearing or flushing its contents. Also, signal $\overline{\text{PXDIRR}}$ indicative of having performed a flush operation, is used to set the state of a flush bit position of a cache syndrome register 14-750. As shown, syndrome register 14-750 also stores signals representative of the occurrence of events and errors as discussed herein pertaining to CPU0 operations. A similar register arrangement is also provided for storing status pertaining to CPU1 operations.

Additionally, the circuits of block 14-66 also generate a directory deallocation signal $\overline{\text{DEALO}}$ which is applied as one input to an OR gate 14-742 which receives as a second input, signal ACPURD from register 14-68/72 generated by a NAND gate 14-744.

In greater detail, the circuits of block 14-66 include a D-type flip-flop 14-660 which is connected to store the occurrence of a bus operational time-out condition in response to a clear bus signal CLRBUS and timing signal TM1OR3. The signal CLRBUS is generated upon receipt of a signal from one of the operational time-out circuits included as part of interface 14-1. That is, interface 14-1 includes 1.2 milliseconds operational time-out circuits for CPU0 and CPU1. When the system bus is in a wait state for a period of more than 1.2 milliseconds, the appropriate time-out circuit operates to force signal CLRBUS to a binary ONE. The flip-flop 14-660 is reset in response to signal $\overline{\text{BUSBST}}$ being forced to a binary ZERO. The output signal OPTMOT from flip-flop 14-660 is applied to one input of a NOR gate 14-662.

NOR gate 14-662 receives as a second input, a signal FIMBER from FIFO subsystem 14-10 indicative of the occurrence of a third party bus error condition. Additionally, NOR gate 14-662 also receives as a third input, signal FIFERR from FIFO subsystem 14-10 indicative of a FIFO overflow condition. The NOR gate 14-662 generates directory clear signal DIRCLR which is stored in register 14-68/72 in response to timing signal PIPEOA+OA.

The FIFO subsystem 14-10 includes overflow detection circuits such as a series of D flip-flops which are connected to detect when the FIFO buffer circuits are unable to receive data of a request from the system bus resulting in an overflow condition. Additionally, the FIFO subsystem 14-10 receives from the response circuits within interface 14-1, bus error signals indicating whether or not a request applied to the system bus 12 by another subsystem and accepted by a designated subsystem has good parity. Any such request stored in the FIFO subsystem 14-10 is accompanied by signal FIMBER which is set to binary ONE to signal the occurrence of the error condition The interface circuits provide correct parity for the request stored in the FIFO subsystem 14-10. These circuits form part of the integrity circuits which enable requests to be retried by a subsystem before acceptance. These circuits while not pertinent to the present invention are described in detail in the copending patent application of George J. Barlow and James W. Keeley entitled, "Resilient Bus System", bearing Ser. No. 623,264, filed on June 21, 1984 and now U.S. Pat. No. 4,763,243 and assigned to the same assignee as named herein. Since the various subsystems may include circuits of this type for making the system of FIG. 1 resilient to bus error conditions, the FIFO subsystem 14-10 provides for the storage of such requests when the criteria indicative of an accepted request has been met.

Also, block 14-66 includes clocked directory control circuit PLA elements 14-664 and 14-666, each of which receive different sets of signals from FIFO subsystem 14-10. The circuit 14-664 operates to generate deallocation signal $\overline{DEALO}$ and a directory write signal $\overline{DIR\ WRE}$ for writing the contents of the validity bit position of an addressed directory location within a selected level as explained herein. As shown, signal $\overline{DIRWRE}$ is applied to one of the enabling input terminals of a 3 to 8 decoder circuit 14-670. As shown, signal ACPURD is applied to a second enabling input terminal of circuit 14-670 along with a write pulse timing signal WRTPLS. The write replacement signals WRL00-02 are decoded by circuit 14-670 which results in one of the signals LVWR0 through LVWR7 being forced to a binary ZERO thereby specifying the directory level to be written.

The circuit 14-666 operates to generate CPU 0 cache reset signal $\overline{P0CACR}$. A similar circuit, not shown, generates signal $\overline{P1CACR}$. These signals are combined within an AND gate 14-668 which generates directory reset signal $\overline{DIRRES}$. The signals $\overline{P0CACR}$ and $\overline{P1CACR}$ are generated in response to interrupt write commands received from SMF 13. The command has a function code equal to the value 9 as indicated by signals FIAD19 through FIAD22 and is an interrupt write command denoted by signal $\overline{FOCMEN}$.

Additionally, block 14-66 includes another pair of clocked PLA element 14-672 and 14-674. The circuit 14-672 in response to signals from FIFO system 14-10 generates as outputs, signals DIRALC through MSHBCL which are used to define the different types of cache cycles of operation during which a flush operation is to be performed when a cache address error or fault is detected. The PLA circuit 14-674 generates in response to the signals shown, signal CPUCYL indicating when the cache subsystem 14-6 is performing a CPU cycle of operation. This signal together with signals DIRALC through MSHBCL are applied as inputs to a clocked PLA element 14-866 which forms part of the second level decoder circuits 14-86. This circuit generates as an output, a flush signal FLUSH indicating when the flushing operation is to take place.

Additionally, FIG. 3 illustrates an alternate arrangement which includes a further NAND gate 14-741A shown in dotted form. Here, the hit decode circuits 14-860 generate as outputs, signal CACERR indicative of a directory address error and signal CACERRA indicative of an input address (source) error.

According to the present invention, PLA element 14-866 is programmed to provide as outputs, first and second flush signals FLUSH and FLUSHA. Each flush signal indicates when flushing is to take place as a function of either directory address error or an input address error. As described herein, the separate classification of address faults can reduce the necessity of having to flush the directory during certain types of cache cycles which can result in increased performance. By utilizing PLA elements, the cache subsystem 14-6 is able to determine under what events and conditions directory flushing should take place. As explained in detail herein, this permits balancing cache coherency and performance in terms of the type of action selected in responding to different types of address faults or errors.

DESCRIPTION OF OPERATION

With reference to the flow diagrams of FIGS. 4, 5a through 5g, the operation of the apparatus of the present invention shown in FIG. 3 will now be described. The cache subsystem 14-6 of the present invention processes requests received from each of the processing units CPU0 and CPU1 in addition to requests from FIFO subsystem 14-10. As previously mentioned, the pipeline clock circuits included in block 14-60 define the different types of cache memory cycles which can initiate the start of the pipeline operation resulting in the generation of a predetermined sequence of signals in response to each request. Also, as indicated in FIG. 3, signals FIFERR, FIMBER and OPTMOT are applied as inputs to the pipeline clock circuits for initiating cache cycles of operation to maintain cache coherency as described herein.

Referring to FIG. 4, it is seen that the different types of operations or cycles performed by cache subsystem 14-6 include a SMF/MRI Interrupt operation, a CPU read cycle, a directory allocation cycle, a lock no cycle, an update cycle, a memory I/O SHBC cycle, a third party bus error cycle, an operational time-out cycle and a FIFO overflow error cycle. With the exception of the SMF interrupt, the cache subsystem 14-6 performs a cycle of operation during which time it checks for the presence of different types of address faults or errors. Based upon the type of event or the type of cycle during which the address fault occurred, the cache subsystem 14-6 selects what action to take in order to recover from the detected address fault in a way which maintains coherency and a high level of performance. The actions which can be taken include bypassing the cache for that particular cycle of operation and flushing the cache directory. Flushing permits the slow reloading of the cache data buffer 14-88/90 with new data.

Figure 5A:
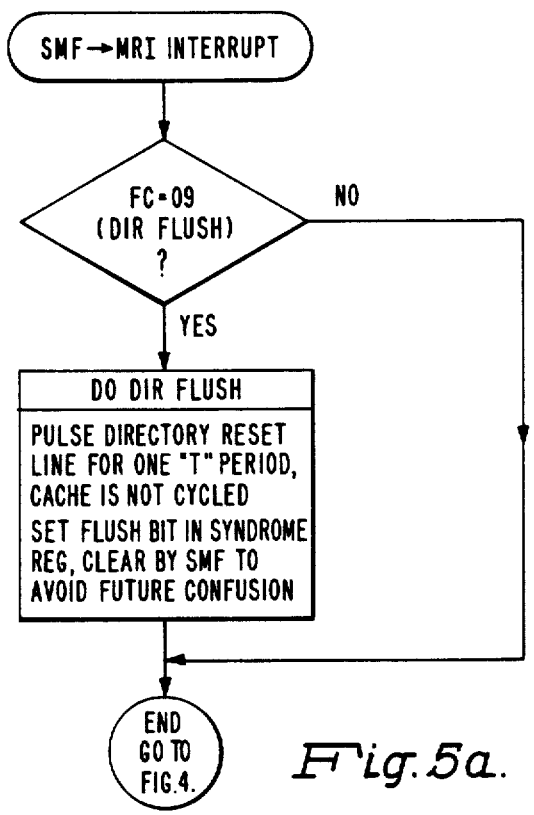
FIGS. 5a through 5g illustrate in greater detail, certain operations shown in FIG. 4.

With reference to FIG. 4, the different types of cycles/operations will now be described. The first operation designated as a SMF/MRI interrupt is initiated by SMF 13 generating a command on system bus 12 which has a function code equal to "09". The function code is decoded by PLA circuit 14-666 of FIG. 3 which results in the generation of directory reset signal $\overline{DIRRES}$. This sequence is shown in FIG. 5a. The directory reset line signal $\overline{DIRRES}$ is pulsed for one clock period defined by signal MCLOCK generated by timing circuits 14-60. This forces $\overline{PXDIRR}$ to a binary ZERO for the same interval of time which flushes the contents of directory memory 14-74/76. This is accomplished by forcing to ZEROS all of the locations within each level of the eight levels. At the same time, signal $\overline{PXDIRR}$ is used to set to a binary ONE a predetermined bit position of syndrome register 14-750. When set, this bit position signals that a cache flush operation has taken place. This bit position will be thereafter reset by SMF 13 to avoid future confusion. This type of operation is included for the purpose of completeness in showing that the cache subsystem 14-6 is able to perform flushing operations in response to commands initiated by SMF 13 during system quality logic test (QLT) operations.

The second operation designated as a CPU read is initiated in response to a cache request by either CPU0 or CPU1 during first or second time intervals respectively. The request address of the requesting CPU is transferred via address selector 14-62 into the directory address latches 14-68/14-72. The address is loaded into the latches of the first pipeline stage in response to timing signal PIPEOA+OA as shown in FIG. 3. As described above, the signals defining the CPU read cause the pipeline start circuits of block 14-60 to generate a sequence of timing signals which include signal PIPEOA+OA. The same signals also cause PLA circuit 14-674 to generate signal CPUCYL in response to signal PIPEOA+OA as shown in FIG. 3. The signal CPUCYL is applied to PLA circuit 14-866 which is programmed to define the action where an address fault is detected (i.e., signal CACERR=1).

Figure 5B:
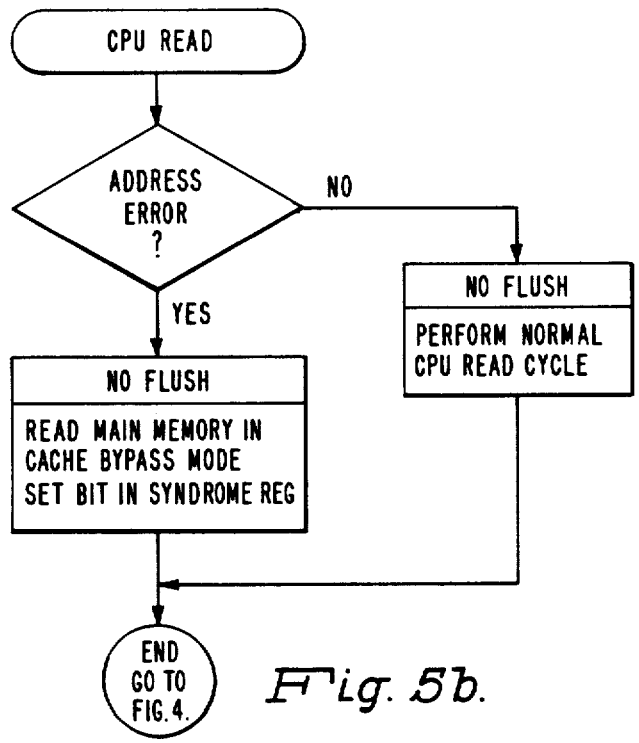

Referring to FIG. 5b, it is seen that in the case where no address error/fault is detected, cache subsystem performs a normal CPU read cycle of operation. However, when an address fault is detected, cache subsystem 14-6 does not perform a flush operation but bypasses the cache for that cycle of operation. That is, the hit decode circuits 14-860 generate signal CACERR which block the hit by inhibiting the generation of the load data signals POLDDT-OL and POLDDT-OR applied to the CPU data register circuits so that the data specified by the CPU request will be automatically fetched from main memory as if the hit did not take place. Also, signal CACERR causes a predetermined bit position within a register of interface 14-1 to be set to a binary ONE state indicative of a cache bypass. This causes data received from memory during the second half bus cycle to be only sent to the requesting CPU and not stored in cache. Also, signal CACERR sets a bit position in syndrome register 14-750. At the start of the next bus request, the CPU resets the CACERR syndrome bit position to ensure proper operation.

The above action still ensures that the cache remains in the same state thus maintaining cache coherency. The fact that there was a directory error or a source address error makes the resulting hit untrustworthy. Hence, there could be a double allocation which could result in a potential incoherency. That is, the allocation of the same location could have been made at two different levels.

The directory memory 14-74/14-76 is changed to the extent that its least recently used (LRU) circuits are updated which has no effect since in the case of a directory address fault the error will repeat and the cache subsystem is bypassed preventing the data received from memory from being written into the cache subsystem 14-6.

The third operation is a directory allocation cycle which is performed when the data specified by the request is not stored in cache data buffer 14-88/14-90. As seen from FIG. 5c, during this cycle, the read request from either CPU0 or CPU1 is presented to the cache subsystem 14-6 by FIFO subsystem 14-10 and the cache row address is written into the location designated by the cache column address in one of the levels assigned to the CPU specified by a write enable signal from decoder circuit 14-670. Thereafter, when the requested data words are returned during the second half bus cycle, this results in a cache SHBC cycle during which the received data stored in data register 14-82 is written into the data buffer 14-88/14-90 at the level specified by the cache column address and hit level signals HIT#0-2 are loaded into the buffer address register 14-80/84.

In performing a directory allocation cycle, the arrangement of FIG. 3 which includes NAND gate 14-741A provides additional advantages in being able to distinguish between the two different types of address faults (i.e., directory address fault and an input address fault). This arrangement assumes that the directory address fault can be considered "hard" (i.e., not a transient condition). As seen from FIG. 5c, under such circumstances, when the input address is faulty/erroneous, the directory memory 14-74/76 is flushed. That is, NAND gate 14-741A forces signal $\overline{\text{DFLUSH}}$ to a binary ZERO in response to signals CACERRA and FLUSHA being forced to binary ONES. Flushing occurs in the manner described by forcing signal $\overline{\text{PXDIRR}}$ to a binary ZERO during the interval of the current cache cycle defined by timing signal PIPEOB+OB applied to NAND gate 14-741. At that time, the directory memory 14-74/76 inhibits the generation of any hit output signals resuting from the performance of parallel directory cycle. Signal $\overline{\text{PXDIRR}}$ also causes the flush bit position of syndrome register 14-750 to be switched to a binary ONE state.

However, in the case where only a directory address fault is detected (i.e., signal CACERR=1), no flushing takes place (i.e., signal FLUSH remains a binary ZERO) and the normal allocation cycle is performed. Because the error is hard, it will also be detected during subsequent allocation cycles of operation. Since this type of address fault will not affect cache coherency if detected during a directory allocation cycle, flushing need not be performed. Hence, the performance of cache subsystem 14-6 is maintained at a high level notwithstanding the detection of such address faults.

Figure 5C:
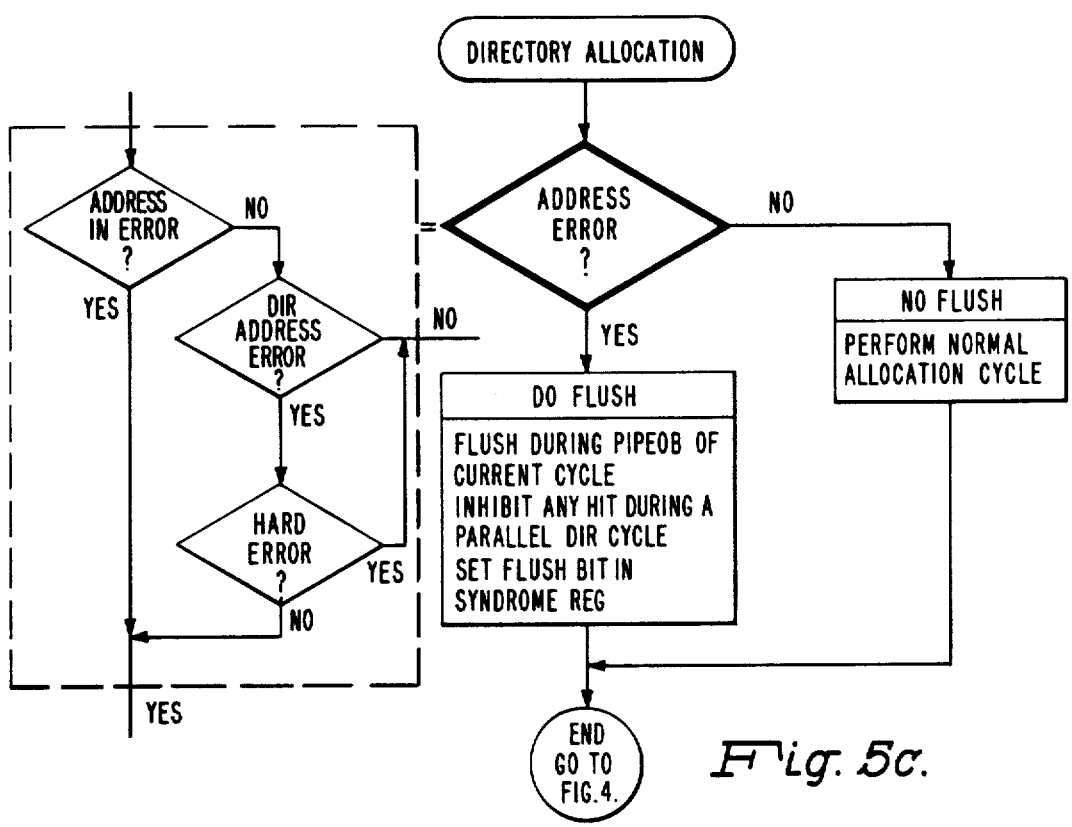
Figure 5D:
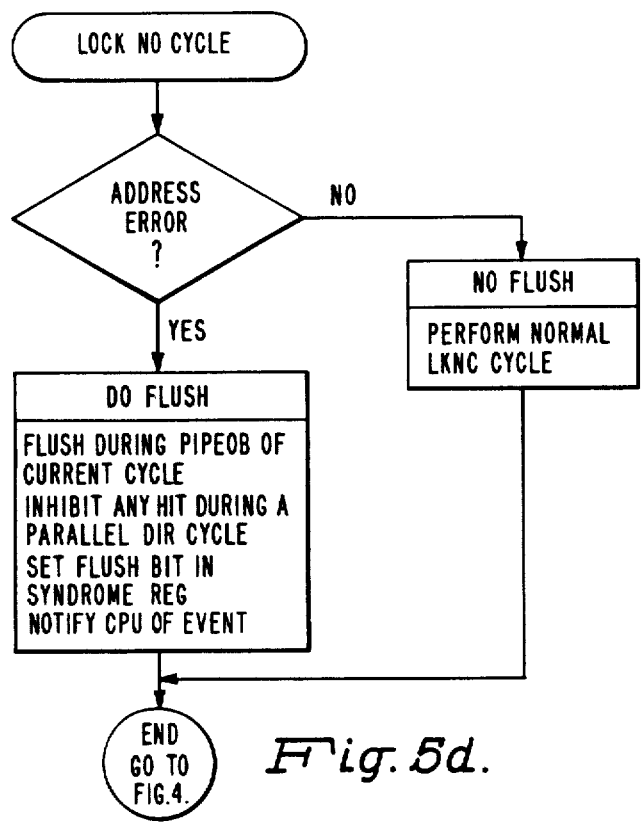

As seen from FIG. 5c, when it is established through testing or the like that this type of address fault is transitory in nature, the PLA circuit 14-866 can be reprogrammed to force signal FLUSH to a binary ONE causing flushing to take place for this type of address fault. In this case, operation proceeds as previously described.

The above illustrates that flushing takes place only when a type of address fault or error is detected which could result in an undetectable double allocation cycle rendering the cache incoherent. At that time, the more serious action is taken in the form of flushing to ensure future reliable operation. In this case, during the second half bus cycle, the directory memory will not generate a hit condition and therefore the data will not be stored in cache but is sent to the requesting CPU.

The fourth type of operation is a lock no cycle operation. From the sequence shown in FIG. 5d, the detection of an address fault or error causes a flush of directory memory 14-74/76 in the same manner as a directory allocation cycle. That is, PLA circuit 14-866 is programmed to force signal FLUSH to a binary ONE state which results in NAND gate 14-741 forcing signal $\overline{\text{DFLUSH}}$ to a binary ZERO when signal CACERR is forced to a binary ONE. Again, flushing takes place during the second stage interval of the current cache defined by signal PIPEOB+OB.

In the above case, during the first half of the lock no cycle operation, when cache subsystem 14-6 detects a hit, the request address is still sent to memory subsystem 20 for the purpose of determining whether the memory location is in a locked state. When the memory subsystem 20 indicates that the location is not locked, it generates an acknowledge signal. The acknowledge signal causes the same location to be read again by applying to cache subsystem 14-10 the address received from the system bus and stored in the FIFO subsystem 14-10. The signal that is generated when the hit was initially detected is designated as bus lock no cycle (FILKNC). Since in the preferred embodiment, CPU0 and CPU1 do not have the ability to retry this type of operation when an error occurs, it is necessary to flush the directory rather than to bypass the cache cycle of operation. It can be seen that if there were such a retry capability, PLA circuit 14-866 could be easily reprogrammed to take this into account.

Figure 5E:
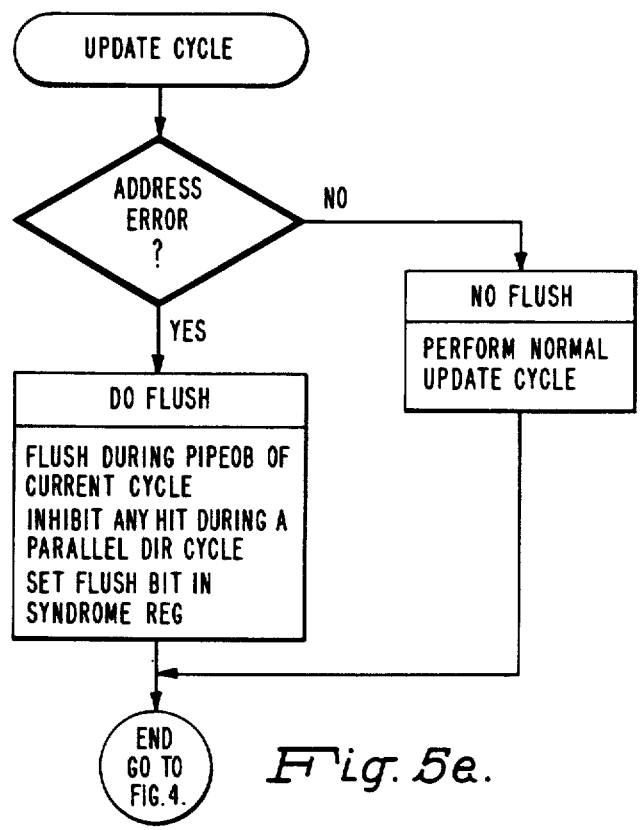

The fifth type of operation is an update cycle of operation. Here the FIFO subsystem 14-10 presents a request to cache subsystem 14-10 for update data received from system bus 12. When a hit is detected, the update data is written into the cache buffer. In FIG. 5e, the heavier solid line around the address error test box denotes that the same sequence of address fault testing performed during the directory allocation cycle is also performed during this cycle. That is, if an address in fault or error is detected, the update operation does not take place. Here, it is possible that this could produce a double allocation. Since it is not known whether or not the update address exists in the cache directory memory, it becomes necessary to flush its contents to avoid incoherency. That is, one processing unit could have written new information into main memory and cache subsystem 14-6 because of the address error is unable to update its contents to be coherent with that change in main memory.

Accordingly, PLA circuit 14-866 is programmed to force signal FLUSHA to a binary ONE state in response to update cycle signal UPDCYL being forced to a binary ONE by PLA circuit 14-672. In the manner previously described, signal $\overline{\text{DFLUSH}}$ is forced to a binary ZERO in response to address error signal CACERR being forced to a binary ONE. As seen in FIG. 5e, flushing occurs during the interval of the current cycle defined by signal PIPEOB+OB. When the update cycle occurs between a directory allocation cycle and a second half bus cycle, the data returned during the second half bus cycle will not be stored in cache (i.e., directory flushed—no hit produced) but is sent to the requesting CPU.

However, in the case where only a directory address fault is detected (i.e., signal CACERR=1), no flushing takes place resulting in a normal update cycle being performed. Since the operation will not affect cache coherency, flushing need not be performed. Here again, cache subsystem 14-6 will operate at a high level of performance As seen from FIG. 4, the sixth and seventh operations are second half bus cycle operations. Here an address was written into directory memory 14-74/76 without any error. During the second half of this operation, the same location is addressed in order to write the requested data into the location which was preallocated. When an address fault or error is detected during this type of cycle, the cache subsystem 14-6 is unable to correctly dispose of the data. Hence, PLA circuit 14-866 is programmed to force signal FLUSH to a binary ONE to cause flushing upon the occurrence of an address error (i.e., CACERR=1).

Since it is only memory second half bus cycles which can affect cache coherency, PLA circuit 14-866 is programmed to cause flushing only during a memory second half bus cycle (i.e., signal MSHBCL=1). The I/O and SMF second half bus cycles effectively bypass the cache subsystem 14-6. Another way of programming PLA circuit 14-866 is to add memory reference signal RPMREF as an input while removing it as an input to PLA circuit 14-672. Thus, PLA circuit 14-672 forces signal SHBCYL to a binary ONE indicative of a second half bus cycle while PLA circuit 14-672 forces signal FLUSH to a binary ONE only when signal RPMREF is a binary ONE indicative of a memory second half bus cycle.

Figure 5F:
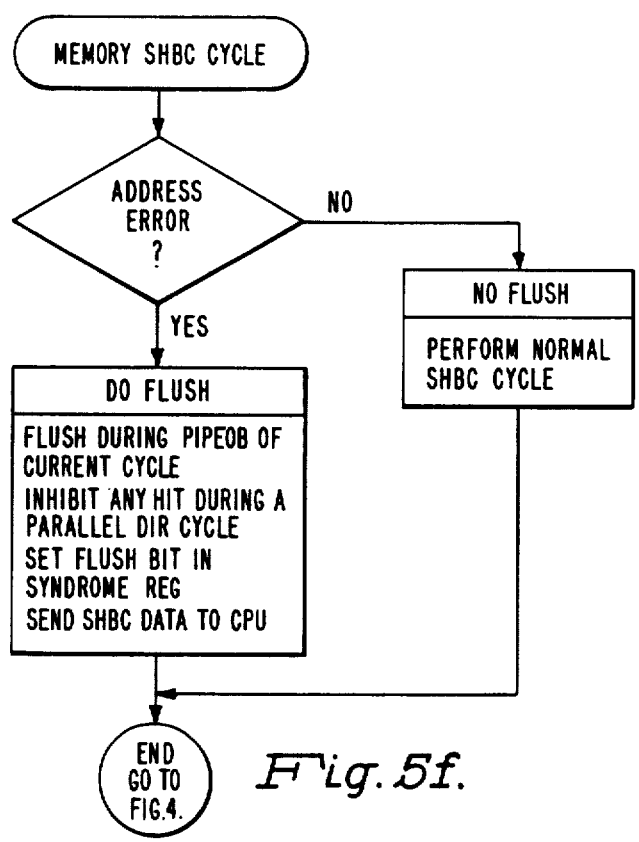

As seen from FIG. 5f, the flushing occurs during the second stage interval of the current cycle defined by signal PIPEOB+OB. The hit decode circuits 14-860 generate signal CACERR which override the hit indicator circuits preventing the data from being written into the data buffer 14-88/90 but being sent to the requesting CPU.

Figure 5G:
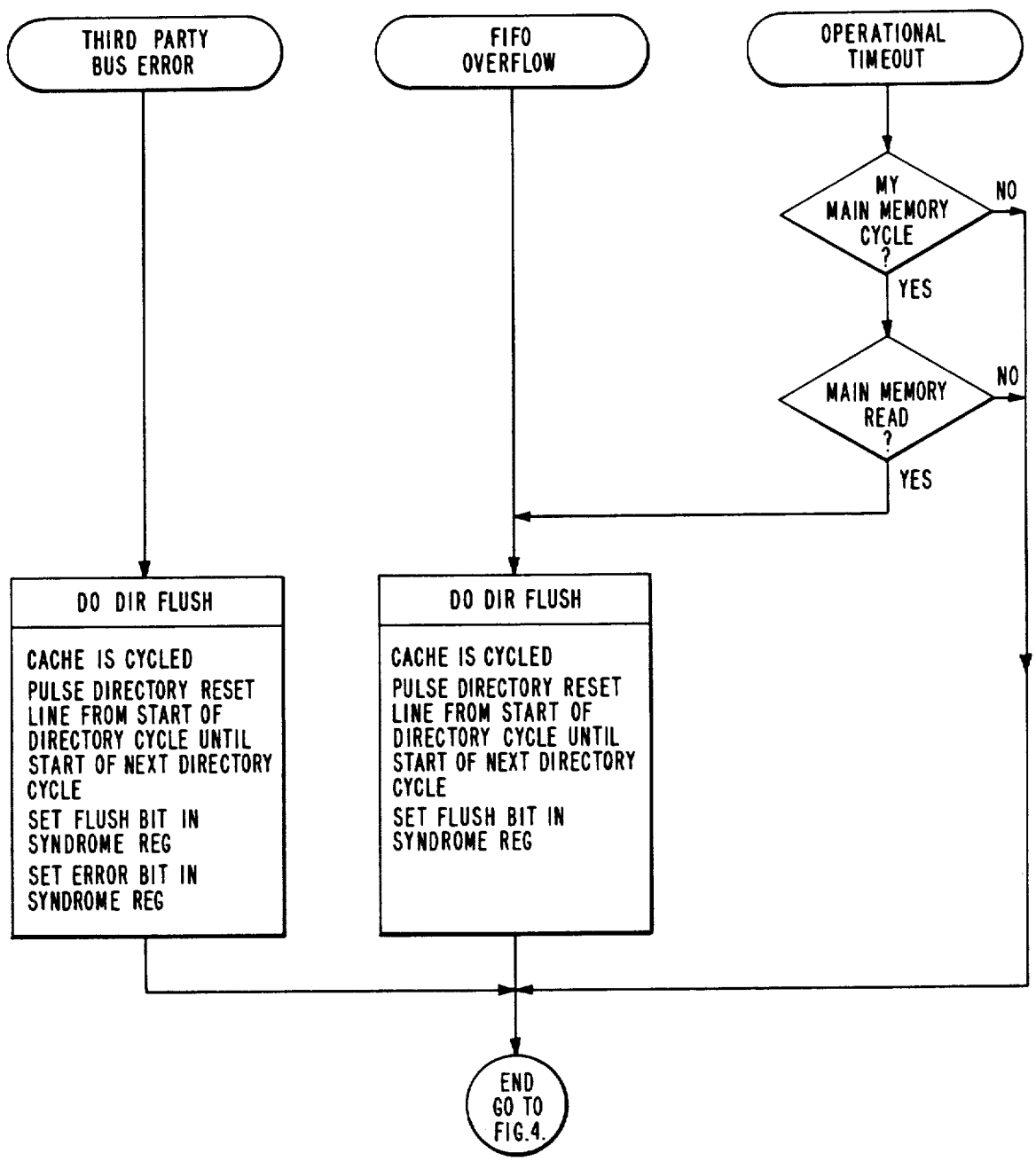

As seen from FIG. 4, the next three events or operations correspond to a third party bus error, and operational time-out and a FIFO overflow error. The sequence of operations for these events are shown in FIG. 5g. In the case of a third party bus error, the FIFO subsystem 14-10 is performing a listening operation in which an error is detected in the data, address or command field of the request applied to the system bus 12 by another subsystem. Since the subsystems include the ability to retry such requests, the receiving unit will not normally respond producing a system time-out enabling retrying to take place. Thus, the request will not be stored by FIFO subsystem 14-10. However, if for any reason, the request is acknowledged by the receiving unit, the FIFO subsystem 14-10 stores the request and presents the request to the directory memory 14-74/76. Since there is no way of identifying the type of cycle which is to take place because of the error, cache subsystem 14-6 performs a flushing operation in order to maintain cache coherency. For example, the information could be a memory write requiring the cache subsystem 14-6 to perform a cache update.

Signal FIMBER is forced to a binary ONE to signal a thirty parity bus error. As seen from FIG. 3, this signal is used to cause NOR gate 14-662 to force directory clear signal DIRCLR to a binary ZERO which is in turn loaded into a bit position of directory address register 14-68/72 in response to signal PIPEOA+OA. This causes AND gate 14-740 to force signal $\overline{\text{PXDIRR}}$ to a binary ZERO from the start of the directory cycle corresponding to the leading edge of signal PIPEOA+OA to the start of the next directory cycle at which time th bit position of register 14-68/72 will be reset to a binary ZERO. Again, the corresponding bit positions of syndrome register 14-750 are set to binary ONES by signals $\overline{\text{PXDIRR}}$ and FIMBER.

As seen from FIG. 5g, similar action is taken in the case of a FIFO overflow error. In this case, a bus cycle of operation results in a loss of information, data, or command. Since the missed cycle could have been a memory write requiring the cache subsystem 14-6 to perform a cache update, the cache subsystem 14-6 again takes the same action of performing a flushing operation. As seen from FIG. 3, signal FIERR representative of the FIFO overflow error, when forced to a binary ONE, causes NOR gate 14-662 to force directory clear signal DIRCLR to a binary ZERO. This causes AND gate 14-740 to force signal $\overline{\text{PXDIRR}}$ to a binary ZERO which flushes the contents of directory memory 14-74/76 as previously described.

The last event which produces a flushing operation is an operational time-out. Here, the cache subsystem 14-6 directed a memory read request to memory subsystem 20 which it acknowledged but which was not followed by a second half bus cycle. The lack of response resulted in an operational time-out. Since the cache subsystem 14-6 is left in an indeterminate state, it performs a flushing operation upon receipt of signal CLRBUS indicative of the operational time-out condition. As seen from FIG. 3, signal CLRBUS switches flip-flop 14-660 to a binary ONE state. This results in signal OPTMOT causing NOR gate 14-662 to force directory clear signal DIRCLR to a binary ZERO. At the same time, signal OPTMOT is used to initiate a cache cycle of operation which enables the flushing operation to take place in the manner previously described.

The above has shown how the apparatus of the present invention is able to respond to the detection of different types of address faults or system events so as to maintain cache coherency without sacrificing performance. By categorizing the types of address failures in terms of the types of cache cycles being performed, action can be taken which will achieve the best results in terms of coherency and performance.

In addition to the above, the preferred embodiment enhances cache resiliency in terms of processing second half bus cycles in which certain types of error conditions are detected. The first such condition is an uncorrectable memory error indicated by the receipt of one or both of the signals FIREDL and FIREDR from the FIFO subsystem 14-10. Here, memory subsystem 20 indicates that the data requested contains an uncorrectable error. Since the location in the directory memory 14-74/76 was already preallocated, it becomes desirable to take certain action which eliminates the need to store erroneous data in cache while still maintaining coherency. Using the contents of the replacement address register which correspond to the address of the preallocated location, the PLA circuit 14-664 during the second half bus cycle generates deallocation signal $\overline{\text{DEALO}}$ and directory write signal DIRWRE. These signals cause OR gate 14-742 and decoder circuit 14-670 to generate the necessary signals for invalidating the preallocated location within directory memory 14-74/76 That is, these signals cause the preallocated directory storage location to be written during a second half bus cycle which serves as a deallocation cycle. Thus, the data is not stored in cache but is only forwarded to the requesting CPU.

The same type of deallocation operation is performed during a second half bus cycle in which a bus lock bit is set (i.e., signal FILOCK = 1). This means that the location which was preallocated does not exist as part of the memory subsystem but rather is part of another system to which the system is coupled (e.g., remote memory). Since this location cannot be tracked, PLA circuit 14-664 operates in the same manner to invalidate the location (deallocate it) during the second half bus cycle. Again, the state of the cache subsystem 14-6 remains unaffected while the data is sent to the requesting CPU.

The above arrangement provides added resiliency in being able to deallocate a given directory location as a function of certain types of conditions.

It will be obvious to those skilled in the art that various changes may be made to the preferred embodiment of the present invention without departing from its teachings. For example, different types of programmable circuits, memory circuits, etc. may be employed. Also, such programmable circuits could be used for generating other signals which result in flushing (e.g. system events).

APPENDIX

The equations for generating the signals of FIGS. 2 and 3 are given by the following Boolean expression:

1.
$$*\text{POLDDT} - \text{OL} = \underbrace{\text{CPUCYL} \cdot \overline{\text{CPUNUM}} \cdot \text{DBWDRD} \cdot \text{EVEHIT} \cdot \text{ODDHIT} \cdot \overline{\text{CACERR}} \cdot \overline{\text{CACERRA}}}_{\text{CPU READ CYCLE}}$$

$$+ \underbrace{\text{CPUCYL} \cdot \overline{\text{CPUNUM}} \cdot \text{DBWDRD} \cdot \overline{\text{CMAD22}} \cdot \overline{\text{CMAD23}} \cdot \text{EVNHIT} \cdot \overline{\text{CACERR}} \cdot \overline{\text{CACERRA}}}_{\text{CPU READ CYCLE}}$$

$$+ \underbrace{\text{CPUCYL} \cdot \overline{\text{CPUNUM}} \cdot \text{DBWDRD} \cdot \text{CMAD22} \cdot \overline{\text{CMAD23}} \cdot \text{ODDHIT} \cdot \overline{\text{CACERR}} \cdot \overline{\text{CACERRA}}}_{\text{CPU READ CYCLE}}$$

$$+ \underbrace{\overline{\text{CPUCYL}} \cdot \overline{\text{FIAD17}} \cdot \text{FISHBA} \cdot \text{RPMREF}}_{\text{I/O SHBC}}$$

$$+ \underbrace{\overline{\text{CPUCYL}} \cdot \overline{\text{FIAD17}} \cdot \text{FISHBA} \cdot \text{RPMREF}.}_{\text{MEM SHBC}}$$

2.
$$*\text{POLDDT} - \text{OR} = \underbrace{\text{CPUCYL} \cdot \overline{\text{CPUNUM}} \cdot \text{DBWDRD} \cdot \text{EVEHIT} \cdot \text{ODDHIT} \cdot \overline{\text{CACERR}} \cdot \overline{\text{CACERRA}}}_{\text{CPU READ}}$$

$$+ \underbrace{\text{CPUCYL} \cdot \overline{\text{CPUNUM}} \cdot \text{DBWDRD} \cdot \text{CMAD22} \cdot \text{EVNHIT} \cdot \overline{\text{CACERR}} \cdot \overline{\text{CACERRA}}}_{\text{CPU READ}}$$

-continued $+\overline{CPUCYL} \cdot \overline{CPUNUM} \cdot DBWDRD \cdot CMAD22 \cdot ODDHIT \cdot \overline{CACERR} \cdot \overline{CACERRA}$
                    CPU READ $+\overline{CPUCYL} \cdot \overline{FIAD17} \cdot FISHBA \cdot \overline{RPMREF}$
          I/O SHBC $+\overline{CPUCYL} \cdot \overline{FIAD17} \cdot FISHBA \cdot RPMREF.$
          MEM SHBC

*P1LDDT−OL = same as 1 except CPUNUM=CPUMUN.    3.

*P1LDDT−OR = same as 2 except CPUNUM=CPUMUN.    4.

*SWAPLT = CPUCYL·CMAD22    5.
          CPU READ $+\overline{CPUCYL} \cdot FISHBA \cdot RPMREF \cdot RPAD22.$
          MEM SHBC

*SWAPRT = CPUCYL·$\overline{DBWDRD}$·$\overline{CMAD22}$    6.
          CPU READ

+CPUCYL·DBWDRD·CMAD22
          CPU READ $+\overline{CPUCYL} \cdot FISHBA \cdot RPMREF \cdot (\overline{FIDBWD} \cdot RPAD22 + FIDBWD \cdot \overline{RPAD22}).$
          MEM SHBC HIT = (HIT0+HIT1+HIT2+HIT3+HIT4+HIT5+HIT6+HIT7)·$\overline{FLUSH}$    7.

$\overline{HIT\#0}$ = HIT0+HIT1+HIT2+HIT3.    8.

$\overline{HIT\#1}$ = HIT0+HIT1+HIT4+$\overline{HIT2}$+$\overline{HIT3}$+HIT5+$\overline{HIT2}$+$\overline{HIT3}$.    9.

$\overline{HIT\#2}$ = HIT0+HIT2+$\overline{HIT1}$+HIT4+$\overline{HIT3}$+$\overline{HIT1}$+HIT6+$\overline{HIT5}$+$\overline{HIT3}$+$\overline{HIT1}$    10.

MAMV = WRL00·(HIT0+HIT1+HIT2+HIT3)+WRL00·(HIT4+HIT5+HIT6+HIT7).    11.

MAM1 = WRL01·(HIT0+HIT1+HIT2+HIT3)+HIT6+HIT7.    12.

MAM2 = WRL02·(HIT0+HIT1+HIT2+HIT3)+HIT5+HIT7.    13.

CACERR = PE0+PE1 ... PE7;    14.

CACERR = ODAPEA+ODAPEO ... ODAPE2.

PTOSEL = TM1AD2·$\overline{PTOBSY}$·PORD02.    15.

FIALOCYC = FIMREF·$\overline{FIWRIT}$·$\overline{FILKNC}$.    16.

FIUPDATE = FIMREF·FIWRIT.    17.

LVWR0 = WRTPLS·($\overline{FIDT16}$·FIDT17·$\overline{FIDT18}$·FIDT19·$\overline{FIDT20}$·$\overline{FIDT21}$)·FIALOCYCL.    18.

LVWR7 = WRTPLS·(FIDT16·FIDT17·FIDT18·FIDT19·FIDT20·FIDT21)·FIALOCYCL.    19.

WRL00−WRL02 = FIDT16−18 or FIDT19−21.    20.

DIRALC = FIMREF·$\overline{FIWRIT}$·$\overline{FILKNC}$.    21.

LKNCYL = FILKNC.    22.

UPDCYL = FIMREFF·FIWRIT.    23.

MSHBCL = RPMREF·FISHBA.    24.

CPUCYL = PY0SEL+PT1SEL.    25.

-continued $$\text{FLUSH} = \text{FLUSHA} = \underbrace{\overline{\text{DIRALC}} + \overline{\text{LKNCYL}} + \overline{\text{UPDCYL}} + \overline{\text{MSHBCL}} + \overline{\text{CPUCYL}}}_{\text{TRANSIENT ERROR}} \cdot \tag{26}$$

$$\text{FLUSH(DIR. ADDRESS ERROR)} = \underbrace{\overline{\text{LKNCYL}} + \overline{\text{MSHBCL}} + \overline{\overline{\text{CPUCYL}}}}_{\text{HARD ERROR}} \tag{27}$$

$$\text{FLUSHA(ADDRESS IN ERROR)} = \underbrace{\overline{\text{DIRALC}} + \overline{\text{LKNCYL}} + \overline{\text{UPDCYL}} + \overline{\text{MSHBCL}} + \overline{\text{CPUCYL}}}_{\text{HARD ERROR}} \tag{28}$$

$$\text{DEAL0} = \overline{\text{FIAD21}} \cdot \overline{\text{FIAD22}} \cdot \text{FILOCK} \cdot \text{FISHBA} \cdot \text{RPMREF} + \overline{\text{FIAD21}} \cdot \text{FIAD22} \cdot \text{FIREDL} \cdot \text{FISHBA} \cdot \text{RPMREF} + \tag{29}$$

$$\overline{\text{FIAD21}} \cdot \text{FIDBWD} \cdot \text{FIAD22} \cdot \text{FIREDR} \cdot \text{FISHBA} \cdot \text{RPMREF} + \overline{\text{FIAD21}} \cdot \text{FIADBWD} \cdot \text{FILOCK} \cdot \text{FISHBA} \cdot \text{RPMREF}$$

$$\text{DIRWRE} = \text{FIAD22} \cdot \text{FILKNC} \cdot \text{FIREAD} + \text{FIDBWD} \cdot \text{FIRESQ} \cdot \text{FILKNC} \cdot \text{FIREAD} + \text{FIAD21} \cdot \text{FIAD22} \cdot \text{FILOCK} \cdot \tag{30}$$

$$\text{FISHBA} \cdot \text{RPMREF} + \text{FIAD21} \cdot \text{FIAD22} \cdot \text{FIREDL} \cdot \text{FISHBA} \cdot \text{RPMREF} + \text{FIAD21} \cdot \text{FIDBWD} \cdot \text{FIAD22} \cdot$$

$$\text{FIREDR} \cdot \text{FISHBA} \cdot \text{RPMREF} + \text{FIAD21} \cdot \text{FIDBWD} \cdot \text{FILOCK} \cdot \text{FISHBA} \cdot \text{RPMREF}$$

*These signals are clocked with signal PIPE0B+0A.

DESCRIPTION OF EQUATION TERMS

1. DBWDRD = Double word read command defined by ROS data bit 4=1 and ROS data bit 5=0 generated by the decode circuits of block 14-66 which is clocked with signal PIPE0A+0A.
2. CPUNUM = CPU number (CPU0 or CPU1) signal generated by the circuits of block 14-66 which is clocked with signal PIPE0A+0A.
3. CPUCYL = CPU cycle signal generated by the circuits of block 14-66 and which is clocked with signal PIPE0A+0A.
4. EVNHIT = HIT signal generated by the hit decode circuits 14-680 associated with the even directory memory 14-76.
5. CMAD22 = Cache memory address bit 22 generated at the output of selector 14-62.
6. CMAD23 = Cache memory address bit 23, generated at the output of selector 14-62, specifies which half (left or right) of data register 14-94 or 14-96 is to be loaded with a data word.
7. FIAD17 = FIFO address bit 17 from FIFO subsystem 14-10 defines which CPU is to receive the replacement data.
8. FIDBWD = FIFO double-wide word command bit from FIFO subsystem 14-11 specifies when the data being returned has two words.
9. FISHBA = FIFO second half bus cycle acknowledge signal from 14-11 specifies that the FIFO subsystem requires a cache cycle to process data received from an I/O device or memory during a second half bus cycle SHBC.
10. ODDHIT = HIT signal generated by the hit decode circuits 14-680 associated with the odd directory memory 14-74.
11. RPMREF = Memory reference signal provided by RAR 14-12 which permits any exception conditions to be taken into account.
12. RPAD22 = Replacement address bit 22 from RAR 14-12.
13. FIDT16-18/19-21 = The even/odd data bits defining the cache level provided by the FIFO subsystem 14-10.
14. CYFIFO = A cycle signal generated by the FIFO cycle select logic circuits of block 14-60 during a free pipeline stage.
15. FISHBC = The second half bus cycle signal from FIFO subsystem 14-10.
16. WRTPLS = The write pulse signal generated by the circuits of block 14-60 which occurs midway between either clocking signals PIPE0A+0A AND PIPE0A+0B or clocking signals PIPE0B+0A and PIPE0B+0B.
17. FIMREF = The bus memory reference signal BSMREF from FIFO subsystem 14-10.
18. FIWRIT = The bus memory write signal BSWRIT from FIFO subsystem 14-10.
19. TM1AD2 = Time slot allocated to CPU0.
20. PTOBSY = Signal from interface area 14-1 indicating that CPU0 is not busy.
21. PORD02 = The state of bit position 2 of ROS14-24 indicating that CPU0 has requested a cycle of operation.
22. FILKNC = The lock no cycle signal BSLKNC from FIFO subsystem 14-10 for signalling memory when it is to perform a memory cycle following its testing/resetting of a lock condition.
23. FIAD21 = FIFO address bit 21 from FIFO subsystem 14-10 for signalling when the cache subsystem is to be bypassed.
24. FIAD22 = FIFO address bit 22 from FIFO subsystem 4-10 for signalling whether the SHBC address is even or odd.
25. FIREAD = Read signal derived from BSWRIT received from FIFO subsystem 14-10.
26. FIRESQ = Rescue signal BSRESQ from FIFO subsystem 4-10 for indicating when a double word is available to be sent in response to the request.
27. FIREDL = Red left signal BSREDL from FIFO subsystem 14-10 indicating an uncorrectable error in the left word of a double word.
28. FIREDR = Red right signal BSREDR from FIFO subsystem 14-10 indicating an uncorrectable error in the right word of a double word.
29. FILOCK = The lock signal BSLOCK from FIFO subsystem 14-10 indicating when a memory lock cycle operation is to be performed.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A resilient cache memory for maintaining coherency during the occurrence of different types of address faults detected during the processing of memory requests, each request having first and second address portions, said cache memory comprising:

a directory store including:
  an input register for receiving for receiving said each request;
  a plurality of levels, each level including a group of storage locations, each storage location for storing a first address portion of one of said memory requests for designating which level within said cache memory contains data associated therewith, each of said groups of locations within said directory store being accessible by a different one of said second address portions; and,
  means for generating a first number of error signals for indicating the detection of a first type of address fault;
address checking means coupled to said input register, said address checking means being operative to generate a second plurality of address error signals for indicating the detection of a second type of address fault;
a data store having the same number of levels of said groups of locations as said directory store, said groups of locations within said data store being accessible by said second address portions; and,
first programmable control circuit means coupled to said directory store and coupled to receive signals, in response to said memory requests, indicative of different types of cache cycles performable by said cache memory, said first programmable control circuit means in response to said last mentioned signals an output signal indicating which cache cycles said directory store is to be flushed as a function of said first and second address error signals to maintain cache coherency resulting in continued cache operation while said data store is slowly refilled during a succession of normal cache cycles of operation.

2. The cache memory of claim 1 wherein said directory store includes means for generating a plurality of hit signals for indicating the presence of any true comparisons between said stored first address portions and said first portion of said request and wherein said memory further includes hit decode circuit means coupled to said directory store and to said address checking means for receiving said plurality of hit, first and second address error signals, said hit decode circuit means combining said first and second address signals for generating at least one composite cache error signal for bypassing a subsequent cache cycle of operation initiated in response to said memory request.

3. The cache memory of claim 1 wherein said memory further includes directory clear means for receiving and storing signals representative of a plurality of different events which could occur during the operation of said cache memory; and,
output logic means coupled to each of said levels of said directory store, to said first programmable circuit means and to said directory clear means, said output logic means in response to either a signal from said directory clear means or said output signal from said first programmable control circuit means, flushing said directory store by simultaneously resetting said storage locations within each of said levels thereby invalidating said first address portions.

4. The cache memory of claim 3 wherein said plurality of events include an operational time-out, a FIFO overflow cycle and a third party bus error.

5. The cache memory of claim 1 wherein said first programmable control circuit means includes:
first and second clocked programmable logic array (PLA) circuits, said first PLA circuit being connected to receive said signals representative of said different types of cache cycles, said first PLA generating a plurality of signals for indicating the type of cache cycle being performed by said cache memory; and,
said second PLA circuit being coupled to said first PLA circuit, said second PLA circuit generating said output signal for indicating whether or not said directory store is to be flushed upon the occurrence of said first and second address error signals in order to maintain cache coherency.

6. The cache memory of claim 5 wherein said different types of cycles include a CPU read cycle, a directory allocation cycle, a lock no cycle, an update cycle and a memory second half bus cycle.

7. The cache memory of claim 1 wherein said memory further includes:
deallocation circuit means coupled to said directory store; and,
second programmable control circuit means coupled to said deallocation circuit means and for receiving signals indicative of different types of second half bus cycles of operation and the occurrence of different types of error conditions, said second programmable control circuit means upon detecting the occurrence certain ones of said error conditions during predetermined types of second half bus cycles causing said deallocation circuit means to reset to an invalid state, one of said directory store storage locations during the performance of one of said different types of second half bus cycles which was preallocated as apart of an initial processing of said memory request so as to maintain said cache memory coherent.

8. A multiprocessing system comprising a plurality of processing subsystems and a main memory coupled in common to an asynchronous system bus, each processing subsystem including a cache memory for providing high speed access by a number of processing units to coherent main memory data in response to memory requests transmitted on said system bus by said processing subsystems, each memory request containing first and second address portions of a cache memory address generated by one of said processing subsystems, said cache memory address generated by one of said processing subsystems, said cache memory comprising:
a first stage including:
  an input register for receiving said each request;
  a directory store organized into a plurality of levels containing groups of storage locations, each location for storing said first address portion of a memory read request generated by one of said number of processing units associated therewith and each group of locations within said directory store levels being defined by a different one of said second address portions, said directory store including means for generating a plurality of hit signals for indicating the pressure of any true comparisons for indicating the presence of any true comparisons between said stored first address portions and said first portion of said request and a first plurality of error signals for indicating the detection of a first type of address fault;

address checking means coupled to said input register, said address checking means being operative to generate a second plurality of address error signals for indicating the detection of a second type of address fault; and, first programmable control circuit means coupled to said directory store and to receive signals, in response to said memory requests, indicative of different types of cache cycles performable by said cache memory; and, a second cache stage including:

a data store organized into the same number of levels of said groups of locations as in said directory store and each different group of locations within said data store levels being defined by a different one of said second address portions; and, second programmable circuit means coupled to said directory store and to said first programmable circuit means, said second programmable circuit means in response to signals from said first programmable circuit means generating a number of output signals indicating which cache cycles flushing of said directory store is to take place as a function of said first and second address error signals during the operation of said second stage to maintain cache coherency resulting in continued cache operation while said data store is slowly refilled through a succession of normal cycles in which there is an absence of said plurality of said hit signals.

9. The cache memory of claim 8 wherein said second stage further includes hit decode circuit means coupled to said directory store and to said address checking means for receiving said hit, first and second address error signals, said hit decode circuit means combining said first and second address signals for generating at least one composite cache error signal for bypassing a subsequent cache cycle of operation initiated in response to said memory request.

10. The cache memory of claim 8 wherein said first stage further includes directory clear means for receiving and storing signals representative of a plurality of different system events which could occur during the operation of said cache memory; and, output logic means coupled to each of said levels of said directory store, to said programmable circuit means and to said directory clear means, said output logic means in response to either a signal from said directory clear means or said output signal from said second programmable control circuit means flushing said directory store by simultaneously resetting said storage locations within each of said levels thereby invalidating said first address portions.

11. The cache memory of claim 10 wherein said plurality of events include an operational time-out, a FIFO overflow cycle and a third party bus error.

12. The cache memory of claim 8 wherein said first and second programmable control circuit means respectively include:

first and second clocked programmable logic array (PLA) circuits, said first PLA circuit being connected to receive said signals representative of said different types of cache cycles and a timing signal defining a time interval for a first stage operation, said first PLA circuit generating a plurality of signals for indicating the type of cache cycle being performed by said cache memory; and, said second PLA circuit being coupled to said first PLA circuit and to receive a timing signal defining a succeeding interval for a second stage operation, said second PLA circuit generating said number of output signals for indicating whether or not said directory store is to be flushed during said succeeding interval upon the occurrence of said first and second address error signals in order to maintain cache coherency in a manner which maintains a high level of performance.

13. The cache memory of claim 12 wherein said different types of cycles include a CPU read cycle, a directory allocation cycle, a lock no cycle, an update cycle and a memory second half bus cycle.

14. The cache memory of claim 8 wherein said first stage further includes:

deallocation circuit means coupled to said directory memory; and, third programmable control circuit means coupled to said deallocation circuit means and for receiving signals indicative of different types of second half bus cycles of operation and the occurrence of different types of error conditions, said third programmable control circuit means upon detecting the occurrence of certain ones of said error conditions during predetermined types of second half bus cycles, causing said deallocation circuit means to reset to an invalid state one of said directory store storage locations during the performance of one of said types of second half bus cycles which was preallocated as part of an initial processing of said memory request so as to maintain said cache memory coherent.

15. A multiprocessing system comprising a plurality of data processing subsystems and at least one main memory subsystem coupled in common to an asynchronous system bus, each data processing subsystem including a plurality of processing units, a FIFO buffer subsystem coupled to said system bus, and a pipelined cache memory subsystem coupled to said processing units and to said FIFO buffer subsystem, each processing unit being operative to generate memory requests to said cache subsystem for data and said FIFO subsystem to generate requests to said cache subsystem for replacing and updating data in said cache subsystem, each request including an address, said cache subsystem comprising:

input selection means for selecting a request address from one of said processing units subsystems during a preallocated time slot interval;

a first pipeline cache stage coupled to said input selection means, said pipeline stage including:

an input register for receiving said each request;

a directory store organized into a plurality of levels containing groups of storage locations, each location for storing said first address portion of a memory read request generated by one of said number of processing units associated therewith and each group of locations within said directory store levels being defined by a different one of said second address portions, said directory store including means for generating a plurality of hit signals for indicating the presence of any true comparisons between said stored first address portions and said second portion of said request and a first plurality of error signals for indicating the detection of a first type of address fault;

address checking means coupled to said input register, said address checking means being operative to generate a second plurality of address error signals for indicating the detection of a second type of address fault; and, first programmable control circuit means coupled to said directory store and to receive signals, in response to said memory request, indicative of different types of cache cycles performable by said cache memory; and, a second cache pipeline stage including:

a data store organized into the same number of levels of said groups of locations as in said directory store and each different group of locations within said data store levels being defined by a different one of said second address portions; and, second programmable circuit means coupled to said directory store and to said first programmable circuit means, said second programmable circuit means in response to signals from said first programmable circuit means generating a number of output signals indicating which cache cycles flushing of said directory store is to take place as a function of said first and second address error signals during the operation of said second stage which maintains cache coherency resulting in continued operation while said data store is slowly refilled through a succession of normal cycles in which there is an absence of said plurality of hit signals.

16. The cache memory of claim 15 wherein said second stage further includes hit decode circuit means coupled to said directory store and to said address checking means for receiving said hit, first and second address error signals, said hit decode circuit means combining said first and second address signals for generating at least one composite cache error signal for bypassing a subsequent cache cycle of operation initiated in response to said memory request.

17. The cache memory of claim 15 wherein said first stage further includes directory clear means for receiving and storing signals representative of a plurality of different events which could occur during the operation of said cache; and, output logic means coupled to each of said levels of said directory store, to said programmable circuit means and to said directory clear means, said output logic means in response to either a signal from said directory clear means or said output signal from said second programmable control circuit means flushing said directory store by simultaneously resetting said storage locations within each of said levels thereby invalidating said first address portions.

18. The cache memory of claim 17 wherein said plurality of events include an operational time-out, a FIFO overflow cycle and a third party bus error.

19. The cache memory of claim 15 wherein said first and second programmable control circuit means respectively include:

first and second clocked programmable logic array (PLA) circuits, said first PLA circuit being connected to receive said signals representative of said different types of cache cycles and a timing signal defining a time interval for a first stage operation, said first PLA circuit generating a plurality of signals for indicating the type of cache cycle being performed by said cache memory; and, said second PLA circuit being coupled to said first PLA circuit and to receive a timing signal defining a succeeding interval for a second stage operation, said second PLA circuit generating said number of output signals for indicating whether or not said directory store is to be flushed during said succeeding interval upon the occurrence of said first and second address error signals in order to maintain cache coherency in a manner which maintains a high level of performance.

20. The cache memory of claim 19 wherein said different types of cycles include a CPU read cycle, a directory allocation cycle, a lock no cycle, an update cycle and a memory second half bus cycle.

21. The cache memory of claim 15 wherein said first stage further includes:

deallocation circuit means coupled to said directory store; and, third programmable control circuit means coupled to said deallocation circuit means and for receiving signals indicative of different types of second half bus cycles of operation and the occurrence of different types of error conditions, said third programmable control circuit means upon detecting the occurrence of certain ones of said error conditions during predetermined types of second half bus cycles causing said deallocation circuit means to reset to an invalid state one of said directory store storage locations during the performance of one of said predetermined types of second half bus cycles which was preallocated as part of an initial processing of said memory request so as to maintain said cache memory coherent.

* * * * *